(12) United States Patent
Hirose et al.

(10) Patent No.: US 8,999,583 B2
(45) Date of Patent: Apr. 7, 2015

(54) LITHIUM-ION SECONDARY BATTERY, ANODE FOR LITHIUM-ION SECONDARY BATTERY, POWER TOOL, ELECTRIC VEHICLE AND ENERGY STORAGE SYSTEM

(75) Inventors: Takakazu Hirose, Fukushima (JP);
Kenichi Kawase, Fukushima (JP);
Takashi Fujinaga, Fukushima (JP);
Masaharu Senoue, Fukushima (JP);
Motoki Endo, Fukushima (JP);
Masayuki Iwama, Fukushima (JP)

(73) Assignee: Sony Corporation, Tokyo (JP)

( * ) Notice: Subject to any disclaimer, the term of this patent is extended or adjusted under 35 U.S.C. 154(b) by 841 days.

(21) Appl. No.: 12/970,270

(22) Filed: Dec. 16, 2010

(65) Prior Publication Data

US 2011/0159368 A1    Jun. 30, 2011

(30) Foreign Application Priority Data

Dec. 24, 2009 (JP) ................. 2009-292430
Apr. 6, 2010 (JP) ................. 2010-087659
Oct. 28, 2010 (JP) ................. 2010-242174

(51) Int. Cl.
*H01M 4/13* (2010.01)
*H01M 4/58* (2010.01)
*H01M 4/00* (2006.01)
(Continued)

(52) U.S. Cl.
CPC .............. *H01M 4/134* (2013.01); *H01M 4/366* (2013.01); *H01M 4/48* (2013.01); *H01M 10/0525* (2013.01); *H01M 4/663* (2013.01); *Y02E 60/122* (2013.01); *Y02T 10/7011* (2013.01)

(58) Field of Classification Search
USPC ......... 429/231.95, 218.1, 220, 221, 223, 224, 429/225, 231.6; 252/182.1
See application file for complete search history.

(56) References Cited

U.S. PATENT DOCUMENTS 5,395,711 A    3/1995  Tahara et al.
7,141,187 B2 *  11/2006 Kosuzu et al. ............. 252/521.3
(Continued)

FOREIGN PATENT DOCUMENTS

CN     1492524 A    4/2004
EP     1926163      5/2008
(Continued)

OTHER PUBLICATIONS

Cui et al., "Crystalline-Amorphous Core-Shell Silicon Nanowires for High Capacity and High Current Battery Electrodes", Nano Lett., Jan. 13, 2009.*

(Continued)

*Primary Examiner* — Patrick Ryan
*Assistant Examiner* — Julian Anthony
(74) *Attorney, Agent, or Firm* — Dentons US LLP

(57) ABSTRACT

A lithium-ion secondary battery allowed to improve cycle characteristics and initial charge-discharge characteristics is provided. The lithium-ion secondary battery includes a cathode; an anode; and an electrolytic solution. The anode includes an anode active material layer including a plurality of anode active material particles. The anode active material particles each include a core section and a coating section applied to a part or a whole of a surface of the core section, and the core section includes a silicon-based material ($SiO_x$: $0 \leq x < 0.5$) and the coating section includes an amorphous or low-crystalline silicon-based material ($SiO_y$: $0.5 \leq y \leq 1.8$).

30 Claims, 10 Drawing Sheets

(51) Int. Cl.
*H01M 4/56* (2006.01)
*H01M 4/88* (2006.01)
*H01M 4/134* (2010.01)
*H01M 4/36* (2006.01)
*H01M 4/48* (2010.01)
*H01M 10/0525* (2010.01)
*H01M 4/66* (2006.01)

(56) References Cited

U.S. PATENT DOCUMENTS

| | | | |
|---|---|---|---|
| 7,459,236 | B2 | 12/2008 | Konishiike et al. |
| 8,435,676 | B2 * | 5/2013 | Zhamu et al. ............... 429/231.8 |
| 2006/0099507 | A1 | 5/2006 | Kogetsu et al. |
| 2008/0176137 | A1 | 7/2008 | Endo et al. |
| 2009/0075173 | A1 | 3/2009 | Jeong et al. |
| 2009/0104536 | A1 | 4/2009 | Kogetsu et al. |
| 2009/0162750 | A1 | 6/2009 | Kawakami |
| 2009/0202911 | A1 | 8/2009 | Fukuoka et al. |
| 2009/0239151 | A1 | 9/2009 | Nakanishi |

FOREIGN PATENT DOCUMENTS

| | | |
|---|---|---|
| JP | 2997741 | 1/2000 |
| JP | 2000-182623 | 6/2000 |
| JP | 2001-185127 | 7/2001 |
| JP | 2002-042806 | 2/2002 |
| JP | 2002-170561 | 6/2002 |
| JP | 2004-146292 | 5/2004 |
| JP | 2005-183264 | 7/2005 |
| JP | 2005-235589 | 9/2005 |
| JP | 2005-294079 | 10/2005 |
| JP | 2006-114454 | 4/2006 |
| JP | 2006-164954 | 6/2006 |
| JP | 2006-244984 | 9/2006 |
| JP | 2007-234255 | 9/2007 |
| JP | 2008-177346 | 7/2008 |
| JP | 2008-251369 | 10/2008 |
| JP | 2008-282189 | 11/2008 |
| JP | 2009-503786 | 1/2009 |
| JP | 2009-070825 | 4/2009 |
| JP | 2009-076363 | 4/2009 |
| JP | 2009-205950 | 9/2009 |
| JP | 2009-212074 | 9/2009 |
| JP | 2009-252579 | 10/2009 |
| WO | 2007/010922 | 1/2007 |
| WO | 2007/136164 | 11/2007 |

OTHER PUBLICATIONS

European Search Report dated May 3, 2011 in connection with counterpart EP Application No. 10 01 5732.

Japanese Office Action issued in connection with counterpart application Japanese patent application No. 2010-242174 dated Apr. 1, 2014.

Chinese Office Action issued in connection with related Chinese Patent Application No. 201010593130.2 dated Jan. 28, 2014.

* cited by examiner

LITHIUM-ION SECONDARY BATTERY, ANODE FOR LITHIUM-ION SECONDARY BATTERY, POWER TOOL, ELECTRIC VEHICLE AND ENERGY STORAGE SYSTEM

BACKGROUND OF THE INVENTION

1. Field of the Invention

The present invention relates to an anode for lithium-ion secondary battery including an anode active material layer allowed to insert and extract lithium ions, a lithium-ion secondary battery using the same, and a power tool, an electric vehicle and an energy storage system using the same.

2. Description of the Related Art

In recent years, small electronic devices typified by portable terminals and the like have been widely used, and further size and weight reduction and longer life of the electronic devices have been strongly demanded. Accordingly, as power sources, batteries, in particular, small and lightweight secondary batteries allowed to obtain a high energy density have been developed. Recently, applications of such secondary batteries to not only small electronic devices but also large electronic devices typified by vehicles have been studied.

In particular, lithium-ion secondary batteries utilizing insertion and extraction of lithium ions for charge-discharge reactions holds great promise, because the secondary batteries are allowed to obtain a higher energy density than lead-acid batteries or nickel-cadmium batteries.

The lithium-ion secondary battery includes a cathode, an anode and an electrolytic solution. The anode includes an anode active material layer, and the anode active material layer includes an anode active material involved in charge-discharge reactions.

As the anode active material, a carbon material is widely used. However, since a further improvement in battery capacity has been demanded recently, it is considered to use silicon. The theoretical capacity of silicon (4199 mAh/g) is much higher than the theoretical capacity of graphite (372 mAh/g), so a significant improvement in battery capacity is expected.

However, when silicon is used as the anode active material, the anode active material swells and shrinks severely to easily cause a crack mainly in proximity to a surface thereof. When the anode active material is cracked, a high-reactive newly-formed surface (an active surface) is formed to cause an increase in a surface area (a reactive area) thereof. Therefore, the decomposition reaction of an electrolytic solution occurs on the newly-formed surface, and the electrolytic solution is consumed to form a coating film derived from the electrolytic solution on the newly-formed surface. Accordingly, cycle characteristic and initial charge-discharge characteristics which are important characteristics of the lithium-ion secondary battery easily decline.

Therefore, to improve battery characteristics such as cycle characteristics, various configurations of the lithium-ion secondary batteries have been studied.

More specifically, to improve cycle characteristics and safety, for example, as described in Japanese Unexamined Patent Application Publication No. 2001-185127, silicon and amorphous silicon dioxide are simultaneously deposited by a sputtering method. To obtain high battery capacity and high safety performance, for example, as described in Japanese Unexamined Patent Application Publication No. 2002-042806, electron-conductive material layers (a carbon material) are arranged on surfaces of silicon oxide particles. To improve high rate charge-discharge characteristics and cycle characteristics, for example, as described in Japanese Unexamined Patent Application Publication No. 2006-164954, an anode active material layer includes silicon and oxygen, and is formed so as to have a larger oxygen ratio on a side close to an anode current collector. To improve cycle characteristics, for example, as described in Japanese Unexamined Patent Application Publication No. 2006-114454, an anode active material layer includes silicon and oxygen, and is formed so that the average oxygen content in the whole anode active material layer is 40 at % or less and the average oxygen content on a side close to an anode current collector is larger. In this case, a difference between the average oxygen content on the side close to the anode current collector and the average oxygen content on a side far from the anode current collector is within a range of 4 at % to 30 at % both inclusive.

Moreover, to improve initial charge-discharge characteristics and the like, for example, as described in Japanese Unexamined Patent Application Publication No. 2009-070825, a nano-composite including a Si phase, $SiO_2$, and a $M_yO$ metal oxide is used. To improve cycle characteristics, for example, as described in Japanese Unexamined Patent Application Publication No. 2008-282819, powdery $SiO_x$ ($0.8 \leq x \leq 1.5$, with a particle diameter range=1 μm to 50 μm) and a carbonaceous material are mixed and fired for 3 to 12 hours at 800° C. to 1600° C. To shorten an initial charge time, for example, as described in International Publication No. WO2007/010922, an anode active material represented by $Li_aSiO_x$ ($0.5 \leq a-x \leq 1.1$ and $0.2 \leq x \leq 1.2$) is used. In this case, lithium is evaporated on an active material precursor including silicon and oxygen. To improve charge-discharge cycle characteristics, for example, as described in Japanese Unexamined Patent Application Publication No. 2008-251369, the composition of silicon oxide is controlled so that the molar ratio of the amount of oxygen to the amount of silicon in an anode active material body is within a range of 0.1 to 1.2 both inclusive and a difference between the maximum value and the minimum value of the molar ratio of the amount of oxygen to the amount of silicon in proximity to an interface between the anode active material body and a current collector is 0.4 or less. To improve load characteristics, for example, as described in Japanese Unexamined Patent Application Publication No. 2008-177346, a lithium-containing porous metal oxide ($Li_xSiO$: $2.1 \leq x \leq 4$) is used.

Further, to improve charge-discharge cycle characteristics, for example, as described in Japanese Unexamined Patent Application Publication No. 2007-234255, a hydrophobic layer of a silane compound, a siloxane compound or the like is formed on a thin film including silicon. To improve cycle characteristics, for example, as described in Japanese Unexamined Patent Application Publication No. 2009-212074, conductive powder formed by coating a surface of silicon oxide (SiOx: $0.5 \leq x < 1.6$) with a graphite coating film is used. In this case, on Raman spectroscopy analysis, the graphite coating film develops broad peaks at 1330 $cm^{-1}$ and 1580 $cm^{-1}$ Raman shift, and an intensity ratio $I_{1330}/I_{1580}$ is $1.5 < I_{1330}/I_{1580} < 3$. To improve a battery capacity and cycle characteristics, for example, as described in Japanese Unexamined Patent Application Publication No. 2009-205950, powder including 1 to 30 mass % of particles with a structure in which a microcrystal of silicon (with a crystal size of 1 nm to 500 nm) is dispersed in silicon dioxide is used. In this case, in a particle size distribution by a laser diffraction/scattering type particle size distribution measurement method, the 90% accumulated diameter (D90) of the power is 50 μm or less, and the particle diameters of the particles are smaller than 2 μm. To improve cycle characteristics, for example, as described in Japanese Unexamined Patent Application Publication No. 2009-076373, silicon oxide ($SiO_x$: $0.3 \leq x \leq 1.6$) is used, and an electrode unit is pressurized with a pressure of 3 kgf/cm² or over during charge and discharge. To improve overcharge characteristics, overdischarge characteristic and the like, for example, as described in Japanese Patent No. 2997741, an oxide of silicon with a silicon-oxygen atomic ratio of 1:y (0<y<2) is used.

SUMMARY OF THE INVENTION

Electronic devices have higher performance and more functions, and the electronic devices are more frequently used, so lithium-ion secondary batteries tend to be frequently charged and discharged. Therefore, further improvements in cycle characteristics and initial charge-discharge characteristics of the lithium-ion secondary batteries are desired.

It is desirable to provide an anode for lithium-ion secondary battery, a lithium-ion secondary battery, a power tool, an electric vehicle and an energy storage system which are allowed to improve cycle characteristics and initial charge-discharge characteristics.

According to an embodiment of the invention, there is provided an anode for lithium-ion secondary battery including: an anode active material layer including a plurality of anode active material particles, in which the anode active material particles each include a core section and a coating section applied to a part or a whole of a surface of the core section. The core section includes a silicon-based material ($SiO_x$: $0 \leq x < 0.5$), and the coating section includes an amorphous or low-crystalline silicon-based material ($SiO_y$: $0.5 \leq y \leq 1.8$). Moreover, according to an embodiment of the invention, there is provided a lithium-ion secondary battery including: a cathode, an anode and an electrolytic solution, in which the anode has the same configuration as that of the above-described anode for lithium-ion secondary battery. Further, according to an embodiment of the invention, there are provided a power tool, an electric vehicle and an energy storage system using a lithium-ion secondary battery as a power supply or a power storage source, in which the lithium-ion secondary battery has the same configuration as that of the above-described lithium-ion secondary battery according to the embodiment of the invention.

In this case, as described above, "low-crystalline" means a state in which when a sectional surface or a surface of the coating section (a silicon-based material) is observed by a high angle annular dark fields scanning transmission electron microscope (HAADF-STEM) or the like, an amorphous region and a crystalline region (a crystal grain) are present. On the other hand, as described above, "amorphous" means a state in which when the coating section is observed by a HAADF-STEM or the like, only an amorphous region is present and a crystalline region is not present. Note that the magnification at the time of observation is, for example, $1.2 \times 10^6$ times.

In the anode for lithium-ion secondary battery according to the embodiment of the invention, the anode active material particles each include a core section and a coating section. The core section includes a silicon-based material ($SiO_x$: $0 \leq x < 0.5$), and the coating section includes an amorphous or low-crystalline silicon-based material ($SiO_y$: $0.5 \leq y \leq 1.8$). In this case, lithium ions are smoothly inserted and extracted in the core section. Moreover, the core section is protected by the coating section so that a newly-formed surface is not exposed during charge and discharge, and even if the core section is coated with the coating section, lithium ions are smoothly inserted and extracted in the core section. Therefore, in the lithium-ion secondary battery using the anode for lithium-ion secondary battery according to the embodiment of the invention, the decomposition reaction of the electrolytic solution is prevented, so cycle characteristics and initial charge-discharge characteristics are allowed to be improved. Moreover, in the power tool, the electric vehicle and the energy storage system using the lithium-ion secondary battery according to the embodiment of the invention, an improvement in characteristics such as the above-described cycle characteristics is achievable.

Other and further objects, features and advantages of the invention will appear more fully from the following description.

DETAILED DESCRIPTION OF THE PREFERRED EMBODIMENTS

Figure 1:
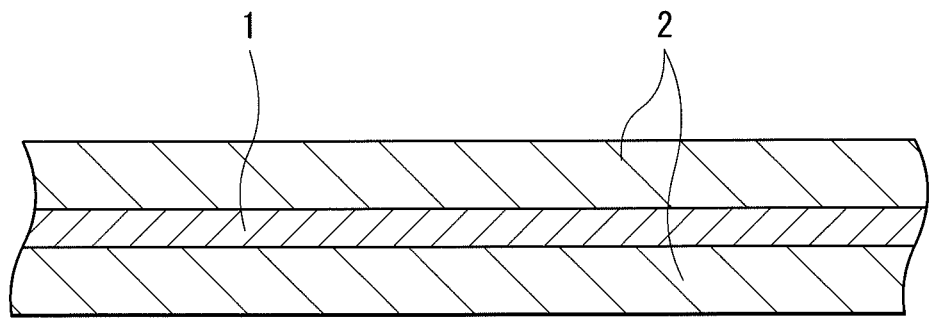
FIG. 1 is a sectional view illustrating a configuration of an anode for lithium-ion secondary battery according to an embodiment of the invention.
Figure 2:
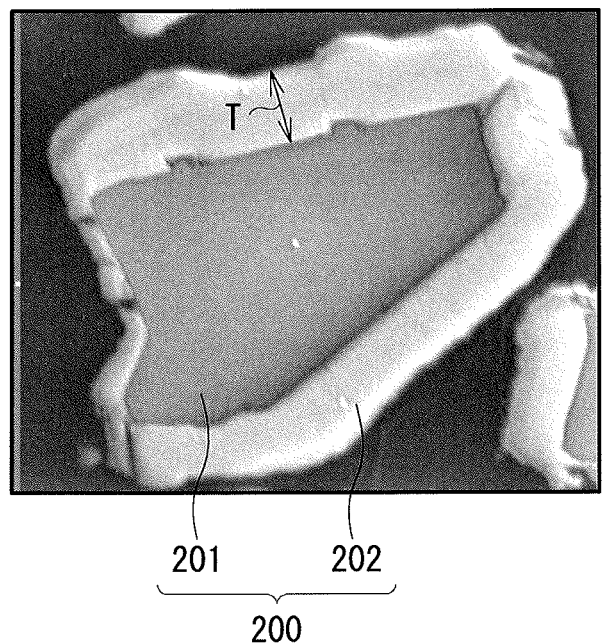
FIG. 2 is a scanning electron microscope (SEM) photograph illustrating a sectional structure of an anode active material particle.

A preferred embodiment of the invention will be described in detail below referring to the accompanying drawings. Descriptions will be given in the following order.
1. Anode for lithium-ion secondary battery
2. Lithium-ion secondary battery
2-1. Prismatic type
2-2. Cylindrical type
2-3. Laminate film type
3. Applications of lithium-ion secondary battery
 1. Anode for Lithium-Ion Secondary Battery
FIG. 1 illustrates a sectional configuration of an anode for lithium-ion secondary battery (hereinafter simply referred to as "anode") according to an embodiment of the invention. FIG. 2 is an SEM photograph illustrating a sectional structure of an anode active material particle, and FIGS. 3 to 6 are HAADF-STEM photographs (hereinafter simply referred to as "TEM photographs") each illustrating an enlarged sectional structure of an anode active material particle.

Whole Configuration of Anode

For example, as illustrated in FIG. 1, the anode includes an anode active material layer 2 on an anode current collector 1. The anode active material layer 2 may be arranged on both surfaces or only one surface of the anode current collector 1. However, the anode current collector 1 may be removed.

Anode Current Collector

The anode current collector 1 is made of, for example, a conductive material with good electrochemical stability, electrical conductivity and mechanical strength. Examples of the conductive material include copper (Cu), nickel (Ni) and stainless, and in particular, a material which does not form an intermetallic compound with lithium (Li) and is alloyed with the anode active material layer 2 is preferable.

The anode current collector 1 preferably includes carbon (C) and sulfur (S), because the physical strength of the anode current collector 1 is improved; therefore, even if the anode active material layer 2 swells or shrinks during charge and discharge, the anode current collector 1 is less likely to be deformed. Examples of such an anode current collector 1 include metal foil doped with carbon and sulfur. The contents of carbon and sulfur are not specifically limited, but both of them are preferably 100 ppm or less, because a higher effect is obtained.

Surfaces of the anode current collector 1 may be roughened as necessary. The anode current collector 1 of which surfaces are not roughened is, for example, rolled metal foil, and the anode current collector 1 of which surfaces are roughened is, for example, metal foil subjected to electrolytic treatment or a sandblast process. The electrolytic treatment is a method of forming fine particles on a surface of metal foil or the like in an electrolytic bath by an electrolytic method to form a roughened surface. Metal foil formed by the electrolytic treatment is generally called "electrolytic foil (for example, electrolytic copper foil)".

In particular, the surfaces of the anode current collector 1 are preferably roughened, because adhesion of the anode active material layer 2 to the anode current collector 1 is improved by a so-called anchor effect. The surface roughness (for example, ten-point average roughness Rz) of the anode current collector 1 is not specifically limited, but the surface roughness of the anode current collector 1 is preferably as large as possible in order to improve the adhesion to the anode active material layer 2 by the anchor effect. However, when the surface roughness is too large, the adhesion to the anode active material layer 2 may decline.

Anode Active Material Layer

As illustrated in FIG. 2, the anode active material layer 2 includes a particulate anode active material (anode active material particles 200) allowed to insert and extract lithium ions, and if necessary, the anode active material layer 2 may further include any other material such as an anode binder or an anode conductor.

Figure 3:
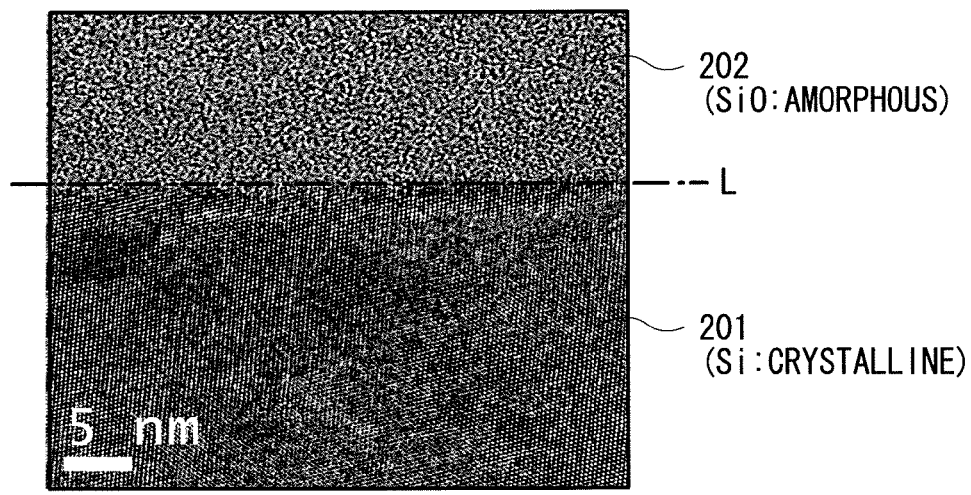
FIG. 3 is a HAADF-STEM photograph illustrating an enlarged sectional structure of an anode active material particle (in which a coating section is amorphous).
Figure 4:
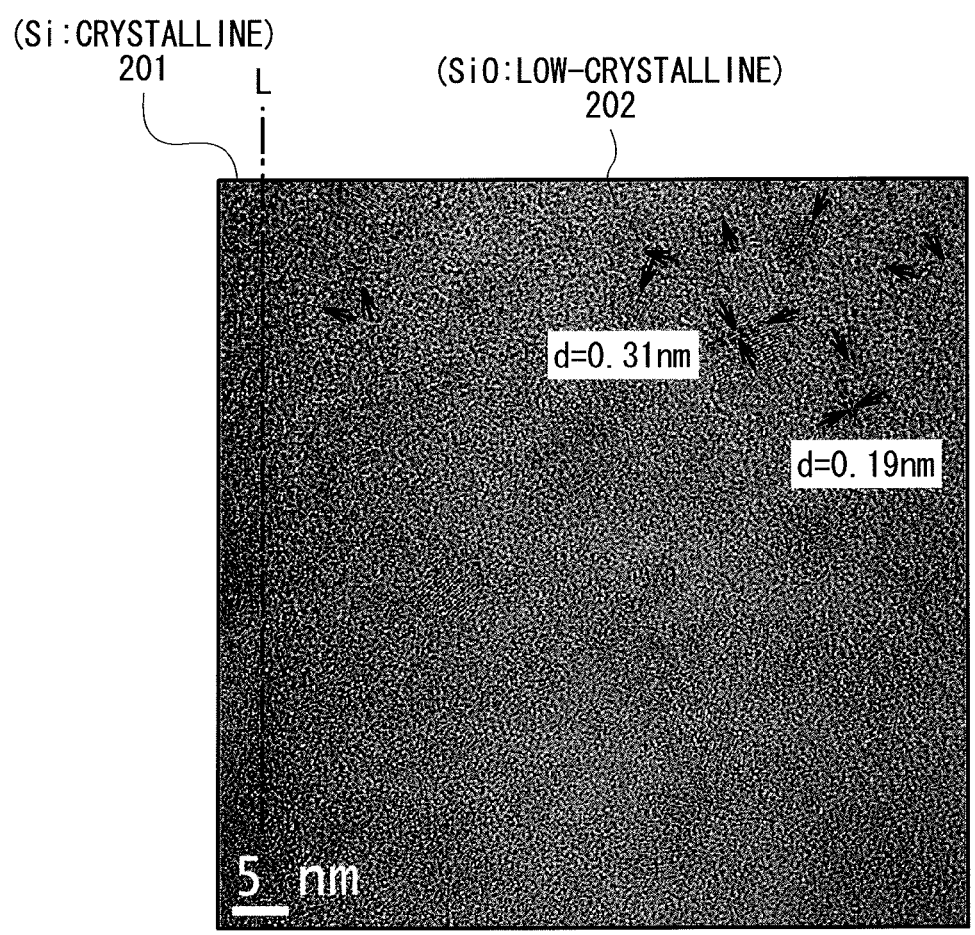
FIG. 4 is a HAADF-STEM photograph illustrating an enlarged sectional structure of an anode active material particle (in which a coating section is low-crystalline).
Figure 5:
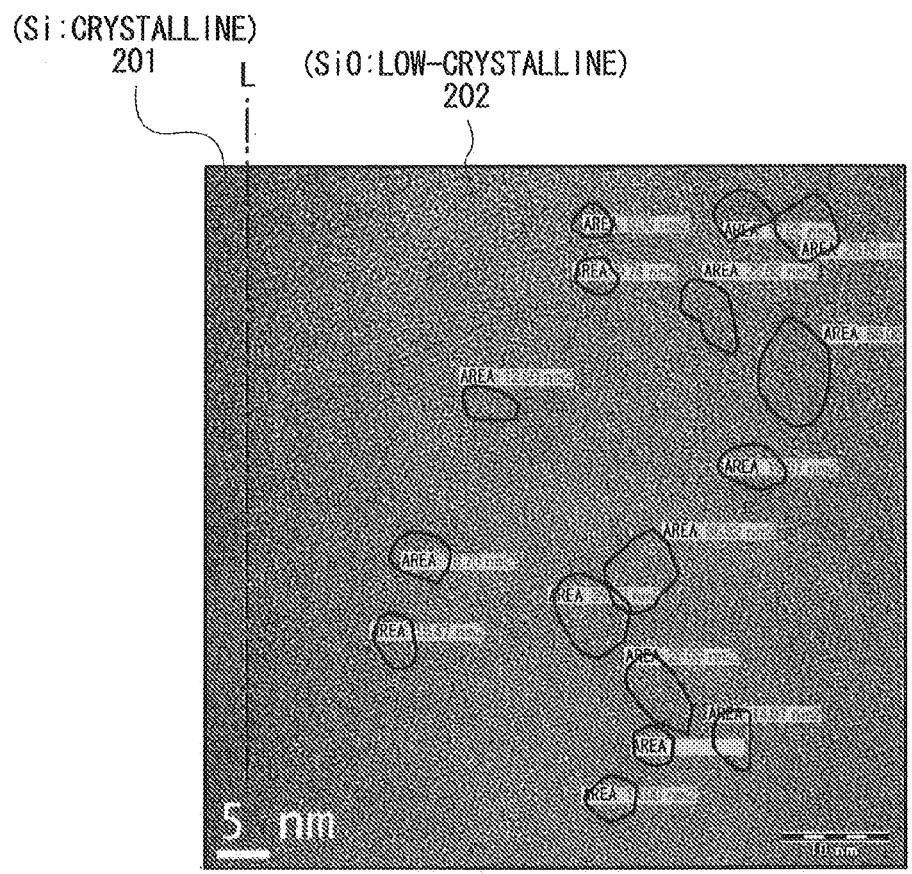
FIG. 5 is another HAADF-STEM photograph illustrating an enlarged sectional structure of an anode active material particle (in which a coating section is low-crystalline).
Figure 6:
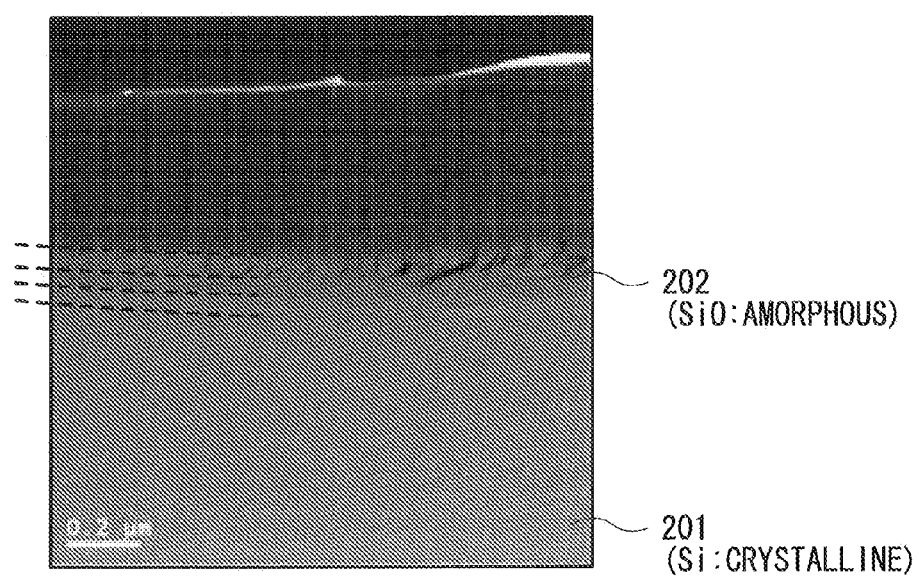
FIG. 6 is a HAADF-STEM photograph illustrating an enlarged sectional structure of an anode active material particle (in which a coating section is amorphous).

The anode active material particles 200 each include a core section 201 and a coating section 202 which are allowed to insert and extract lithium ions, and a part or a whole of a surface of the core section 201 is coated with the coating section 202. As illustrated in FIGS. 2 and 6, a state where the surface of the core section 201 is coated with the coating section 202 is confirmed by an SEM photograph and a TEM photograph. Moreover, as illustrated in FIGS. 3 to 5, the crystalline states of the core section 201 and the coating section 202 are confirmed by a HAADF-STEM photograph.

The core section 201 includes one kind or two or more kinds of silicon-based materials ($SiO_x$: $0 \leq x < 0.5$, preferably $0 \leq x \leq 0.45$). The coating section 202 includes one kind or two or more kinds of silicon-based materials ($SiO_y$: $0.5 \leq y \leq 1.8$).

It is obvious from the above-described chemical formula ($SiO_x$: $0 \leq x < 0.5$) that the silicon-based material of the core section 201 may be a simple substance of silicon (X=0) or silicon oxide ($0 < x < 0.5$). In particular, as the composition of the silicon-based material, x is preferably as small as possible, and x=0 (the simple substance of silicon) is more preferable, because high energy density is obtained to cause an increase in battery capacity. Moreover, it is because as the silicon-based material is resistant to deterioration, discharge capacity is less likely to decline from an initial stage of charge-discharge cycles. In the present invention, "simple substance" means just a general understanding of simple substance (which may include a trace amount of an impurity (elements except for oxygen)), and does not necessarily mean simple substance with a purity of 100%.

It is obvious from the above-described chemical formula ($SiO_y$: $0.5 \leq y \leq 1.8$) that the silicon-based material of the coating section 202 is silicon oxide. In particular, as the composition of the silicon-based material, $7 \leq y \leq 1.3$ is preferable, and y=1 is more preferable, because an after-mentioned protection function of the coating section 202 is effectively fulfilled.

The core section 201 includes the silicon-based material ($SiO_x$: $0 \leq x < 0.5$), because compared to the case where another silicon-based material ($SiO_x$: $0.5 \leq x$) is included, lithium ions are easily inserted and extracted during charge and discharge. Therefore, a high battery capacity or the like is obtained.

The coating section 202 includes the silicon-based material ($SiO_y$: $0.5 \leq y \leq 1.8$), because compared to the case where another silicon-based material ($SiO_y$: $y < 0.5$) is included, the core section 201 is chemically and physically protected by the coating section 202 while securing insertion and extraction of lithium ions in the core section 201.

More specifically, when the coating section 202 is inserted between the core section 201 and an electrolytic solution, the high-reactive core section 201 is less likely to come into contact with the electrolytic solution; therefore, the decomposition reaction of the electrolytic solution is prevented. In this case, as the coating section 202 is formed of a material including the same base as that of the core section 201 (a material including silicon as a constituent element), the adhesion of the coating section 202 to the core section 201 is improved.

Moreover, the silicon-based material ($SiO_y$: $0.5 \leq y \leq 1.8$) of the coating section 202 is more flexible (has a more deformable property) than the silicon-based material ($SiO_x$: $0 \leq x < 0.5$) of the core section 201. Therefore, when the core section 201 swells and shrinks during charge and discharge, the coating section 202 swells and shrinks accordingly, thereby maintaining the coating state of the core section 201 with the coating section 202 even after charge and discharge. In other words, even if the core section 201 swells and shrinks, the coating section 202 is resistant to breakage (such as fracture). Therefore, even if the core section 201 is cracked during charge and discharge, a newly-formed surface is less likely to be exposed, and the newly-formed surface is less likely to come into contact with the electrolytic solution; therefore, the decomposition reaction of the electrolytic solution is prevented.

The coating section 202 may be applied to a part or a whole of the surface of the core section 201. In the former case, the coating section 202 may be applied to a plurality of parts of the surface of the core section 201, because as long as the coating section 202 is applied to only a part of the surface of the core section 201, unlike the case where the coating section 202 is not applied at all, an advantage by the protection function of the coating section 202 is obtained.

To confirm that the anode active material particles 200 each include the core section 201 and the coating section 202, for example, the anode active material particles 200 may be observed by an SEM or a TEM. Moreover, the anode active material particles 200 may be analyzed by, for example, X-ray photoelectron spectroscopy (XPS) or energy dispersive X-ray spectroscopy (EDX).

In this case, when the oxidation degrees (the values of x and y) of a central part and a surface part of the anode active material particle 200 are measured, the compositions (kinds of silicon-based materials) of the core section 201 and the coating section 202 are allowed to be confirmed. To examine the composition of the core section 201 coated with the coating section 202, the coating section 202 may be dissolved and removed by hydrofluoric acid or the like.

For example, specific steps of measuring the oxidation degree are as follows. First, the quantity of the anode active material particle 200 (the core section 201 coated with the coating section 202) is determined by a combustion method to determine the amounts of silicon and oxygen in the whole anode active material particle 200 by calculation. Next, the coating section 202 is removed by washing with hydrofluoric acid, and then the quantity of the core section 201 is determined by the combustion method to determine the amounts of silicon and oxygen in the core section 201 by calculation. Finally, the amounts of silicon and oxygen in the core section 201 are subtracted from the amounts of silicon and oxygen in the whole anode active material particle 200 to determine the amounts of silicon and oxygen in the coating section 202, respectively. The amounts of silicon and oxygen in the core section 201 and the coating section 202 are thereby specified; therefore, the oxidation degrees of the core section 201 and the coating section 202 are allowed to be specified. Instead of removing the coating section 202 by washing, the core sections 201 not coated with the coating section 202 may be used with the core section 201 coated with the coating section 202 to measure the oxidation degrees.

In particular, the coating section 202 is amorphous or low-crystalline, because lithium ions are diffused more easily than the case where the coating section 202 is crystalline (high-crystalline); therefore, even if the surface of the core section 201 is coated with the coating section 202, lithium ions are smoothly inserted and extracted in the core section 201. In other words, even if the core section 201 is coated with the coating section 202, the insertion and extraction of lithium ions are less likely to be inhibited.

In particular, the coating section 202 is preferably amorphous, because the flexibility of coating section 202 is improved; therefore, the coating section 202 easily follows swelling and shrinkage of the core section 201 during charge and discharge. Moreover, as the coating section 202 is resistant to trapping lithium ions, the insertion and extraction of lithium ions in the core section 201 are less likely to be inhibited.

FIGS. 3 and 6 illustrate the case where the core section 201 is made of high-crystalline silicon (Si) and the coating section 202 is made of amorphous silicon oxide (SiO). On the other hand, FIGS. 4 and 5 illustrate the case where the core section 201 is made of high-crystalline silicon and the coating section 202 is made of low-crystalline silicon oxide (SiO).

As described above, "low-crystalline" means that the silicon-based material of the coating section 202 has both of an amorphous region and a crystalline region, and is different from "amorphous" meaning that the silicon-based material has only an amorphous region. To confirm whether the coating section 202 is low-crystalline, for example, the coating section 202 may be observed by a HAADF-STEM or the like. When a state where the coating section 202 has both of an amorphous region and a crystalline region is confirmed by a TEM photograph, the coating section 202 is low-crystalline. In the case where the coating section 202 has the amorphous region and the crystalline region, the crystalline region is observed as a region having a granular contour (a crystal grain). In the crystal grain, a striped pattern (crystal lattice fringes) caused by crystallinity is observed, so the crystal grain is allowed to be distinguished from the amorphous region.

A difference between "amorphous" and "low-crystalline" is clear from TEM photographs illustrated in FIGS. 3 and 4. In the case where the coating section 202 is amorphous, as illustrated in FIG. 3, only an amorphous region is observed, and a crystalline region (a crystal grain having crystal lattice fringes) is not observed. On the other hand, in the case where the coating section 202 is low-crystalline, as illustrated in FIG. 4, a state where crystal grains (parts indicated by arrows) are dotted is observed. The crystal grain has crystal lattice fringes with predetermined spacings according to the lattice spacing d of silicon, so the crystal grain is clearly distinguished from the amorphous region around the crystal grain. In addition, when the TEM photograph illustrated in FIG. 4 was Fourier-transformed (a diagram corresponding to an electron diffraction diagram was obtained), spots were arranged in a ring form; therefore, it was confirmed that a large number of crystalline regions were present in the coating section 202.

Steps of observing the coating section 202 by the HAADF-STEM are as follows. First, an adhesive is applied to a surface of a grid for TEM made of copper, and then a sample (anode active material particles) is sprinkled on the adhesive. Next, a carbon material (graphite) is deposited on a surface of a powder sample by a vacuum evaporation method. Then, a thin film (Pt/W) is deposited on a surface of the carbon material by a focused ion beam (FIB) method, and then thin film processing is further performed (at an accelerating voltage of 30 kV). Finally, a sectional surface of the anode active material particle is observed by the HAADF-STEM (at an accelerating voltage of 200 kV). This observing method is a sensitive technique to the composition of the sample, and in general, an image with bright contrast substantially proportional to the square of an atomic number is obtained.

In the TEM photographs illustrated in FIGS. 3 and 4, regions having different crystalline states divided by a line L as a boundary are observed. When the regions with different crystalline states were analyzed by EDX, it was confirmed that a region positioned inside the line L was a crystalline core section (Si), and a region positioned outside the line L was an amorphous or low-crystalline coating section (SiO).

The level of low crystallinity of the coating section 202 is not specifically limited, but the average area proportion of crystal grains corresponding to (111) plane and (220) plane of silicon is preferably 35% or less, more preferably 25% or less and more preferably 20% or less, because a higher effect is obtained. As illustrated in FIG. 4, a crystal grain corresponding to (111) plane is a crystalline region having crystal lattice fringes with a lattice spacing d of 0.31 nm, and a crystal grain corresponding to (220) plane is a crystalline region having crystal lattice fringes with a lattice spacing d of 0.19 nm.

Steps of determining the average area proportion by calculation are as follows. First, as illustrated in FIG. 5, a sectional surface of the coating section 202 is observed by a HAADF-STEM to obtain a TEM photograph. In this case, observation is made under an observation magnification of $1.2 \times 10^6$ times in an observation area of 65.6 nm×65.7 nm. FIG. 5 is the same TEM photogram as that in FIG. 4. Next, the presence or absence of crystal lattice fringes, the value of the lattice spacing d and the like are determined to specify a range where crystal grains corresponding to (111) plane and (220) plane of silicon are present, and then the contours of the crystal grains are drawn in the TEM photograph. Then, the area of each crystal grain is determined by calculation, and then the area proportion (%)=(total of areas of crystal grains/observation area)×100 is determined by calculation. The drawings of these contours and calculation of the area proportion may be carried out artificially, or mechanically by exclusive processing software. Finally, calculation of the area proportion in 40 areas is carried out, and then the average value (average area proportion) of the determined area proportions on the areas is determined by calculation. In this case, to determine the average area proportion in consideration of the tendency of a crystal grain distribution, it is preferable that the coating section 202 is divided into two equal parts in a thickness direction and the area proportions in 20 areas of an inner part and 20 area of an outer part are determined by calculation.

Moreover, the average particle diameter of the above-described crystal grains corresponding to (111) plane and (220) plane is not specifically limited, but the average particle diameter is preferably 55 nm or less, and more preferably 50 nm or less, because a higher effect is obtained. Steps of determining the average particle diameter are the same as those in the case where the average area proportion is determined by calculation, except that the average particle diameter per area is determined by calculation, and then the average value (a final average particle diameter) of the average diameters is determined by calculation. In the case where the particle diameter of the crystal grain is measured, for example, the contour of the crystal grain is converted into a circle (a circle with an area equal to that of a shape demarcated by the contour of the crystal grain is specified), and then the diameter of the circle is considered as the particle diameter. The calculation of the particle diameter may be carried out artificially or mechanically as in the case where the average area proportion is determined.

Further, when the coating section 202 is divided into two equal parts in the thickness direction as described above, the average area proportions of the inner part and the outer part may be the same as or different from each other. In particular, it is preferable that the average area proportion of crystal grains in the inner part is equal to or larger than that of crystal grains in the outer part (average area proportion in the inner part≥average area proportion in the outer part), because a higher effect is obtained. The same applies to the average particle diameter. As described above, the area proportions and the average particle diameters in 20 areas of the inner part and 20 areas of the outer part are determined by calculation to determine the average area proportions and the average particle diameters in the inner part and the outer part.

Moreover, the coating section 202 may be configured of a single layer or a plurality of layers, but as illustrated in FIG. 6, the coating section 202 is preferably configured of a plurality of layers, because a higher effect is obtained. More specifically, in the case of the coating section 202 configured of a single layer, depending on the thickness of the coating section 202, it is difficult to release the internal stress of the coating section 202; therefore, there is a possibility that when the core section 201 swells and shrinks during charge and discharge, the coating section 202 is broken (cracked, peeled or the like). However, in the case of the coating section 202 configured of a plurality of layers, the internal stress is easily released; therefore, the coating section 202 is resistant to breakage. A broken line illustrated in FIG. 6 indicates an index of a boundary between layers. Note that a whole or a part of the coating section 202 may be configured of a plurality of layers.

In FIG. 6, the coating section 202 has a fibrous shape (a fluffy shape) around a surface thereof, but the shape of the coating section 202 is not limited thereto, because whether the coating section 202 has the fibrous shape does not have a large influence on the protection function of the coating section 202.

The core section 201 may be crystalline (high-crystalline), low-crystalline or amorphous, and in particular, the core section 201 is preferably high-crystalline or low-crystalline, and more preferably high-crystalline, because lithium ions are inserted and extracted easily during charge and discharge; therefore, a high battery capacity or the like is obtained. Moreover, it is because the core section 201 is resistant to swelling and shrinkage during charge and discharge. In particular, in the core section 201, the half-width (2θ) of a diffraction peak corresponding to (111) crystal plane of silicon obtained by X-ray diffraction is preferably 20° or less, and the crystallite size corresponding to the (111) crystal plane is preferably 10 nm or over, because a higher effect is obtained.

The median diameter of the core section 201 is not specifically limited, but the median diameter of the core section 201 is preferably within a range of 0.5 μm to 20 μm both inclusive, because lithium ions are easily inserted and extracted in the core section 201 during charge and discharge, and the core section 201 is resistant to cracking. More specifically, when the median diameter is smaller than 0.5 μm, the total surface area of the core section 201 is too large, and there is a possibility that the core section 201 easily swells and shrinks during charge and discharge. On the other hand, when the median diameter is larger than 20 μm, there is a possibility that the core section 201 is susceptible to cracking during charge and discharge.

The average thickness of the coating section 202 is not specifically limited, but the average thickness is as small as possible, and is preferably within a range of 1 nm to 5000 nm both inclusive, more preferably within a range of 100 nm to 5000 nm both inclusive, because lithium ions are easily inserted and extracted in the core section 201, and the protection function of the coating section 202 is effectively fulfilled. More specifically, when the average thickness is smaller than 1 nm, there is a possibility that it is difficult for the coating section 202 to protect the core section 201. On the other hand, when the average thickness is larger than 5000 nm, there are possibilities that electrical resistance is increased and it is difficult to insert and extract lithium ions in the core section 201 during charge and discharge, because the silicon-based material ($SiO_y$: 0.5≤y<1.8) of the coating section 202 has properties of easily inserting lithium ions and being resistant to extracting the lithium ions once inserted thereinto.

The average thickness of the coating section 202 is determined by the following steps. First, as illustrated in FIG. 2, one anode active material particle 200 is observed by an SEM. The observation magnification is preferably a magnification allowed to visually confirm (determine) a boundary between the core section 201 and the coating section 202 in order to measure a thickness T of the coating section 202. Next, the thicknesses T of the coating section 202 at arbitrary 10 points are measured, and then the average value (the average thickness T per anode active material particle) of the thicknesses T at 10 points is determined by calculation. In this case, it is preferable to set measurement points so that the measurement points are not focused on a specific area and are spread as widely as possible. Next, the above-described steps of determining the average value by calculation are repeated until the total number of anode active material particles observed by the SEM reaches 100. Finally, the average value (the average value of the average thicknesses T) of the average values (the average thicknesses T on a per-particle basis) of the 100 anode active material particles 200 is determined as the average thickness of the coating section 202.

The average coverage of the coating section 202 is not specifically limited, but the average coverage is preferably as large as possible, and in particular, the average coverage is preferably 10% or over, and more preferably 30% or over, because the protection function of the coating section 202 is further improved.

The average coverage of the coating section 202 is determined by the following steps. First, as in the case where the average thickness is determined, one anode active material particle 200 is observed by the SEM. The observation magnification is preferably a magnification allowed to visually distinguish a part coated with the coating section 202 of the core section 201 from a part not coated with the coating section 202 of the core section 201. Next, the length of the part coated with the coating section 202 and the length of the part not coated with the coating section 202 in an outer edge (a contour) of the core section 201 are measured. Then, the coverage (coverage per anode active material particle: %)= (length of the part coated with coating section 202/length of the outer edge of the core section 201)×100 is determined by calculation. Next, the above-described steps of determining the coverage are repeated until the total number of the anode active material particles observed by the SEM reaches 100. Finally, the average value of the coverages (coverages on a per-particle basis) of 100 anode active material particles 200 is determined as the average coverage of the coating section 202.

The core section 201 preferably includes iron (Fe), and the iron content is preferably 0.01 wt % or over, because the electrical resistance of the core section 201 is reduced. A part or a whole of iron included in the core section 201 may be alloyed with a silicon-based material. The composition of the core section 201 including iron is allowed to be confirmed by, for example, EDX.

Moreover, the core section 201 may include one kind or two or more kinds of other metal materials with iron, because the electrical resistance of the core section 201 is further reduced. Examples of such other metal materials include aluminum (Al), calcium (Ca), manganese (Mn), chromium (Cr), magnesium (Mg) and nickel (Ni). The contents of the other metal materials are arbitrarily set.

Alternatively, the core section 201 preferably includes aluminum instead of iron, and the aluminum content (in atomic ratio excluding oxygen) is preferably within a range of 0.1 at % to 50 at % both inclusive, because the core section 201 becomes low-crystalline; therefore, the core section 201 is resistant to swelling and shrinkage during charge and discharge, and diffusibility of lithium ions is improved. Moreover, it is because the electrical resistance of the core section 201 is reduced. A part or a whole of aluminum included in the core section 201 may be alloyed with a silicon-based material. The same applies to a metal material such as chromium which will be described later.

Moreover, the core section 201 may include one kind or two or more kinds of other metal materials with aluminum, because the electrical resistance of the core section 201 is further reduced. Examples of such other metal material include one or more kinds selected from chromium, iron and nickel. The content (the atomic ratio excluding oxygen) of the metal material is preferably within a range of 1 at % to 50 at % both inclusive, because a higher effect is obtained.

Further, the core section 201 may further include, in addition to aluminum and the other metal material which are described above, any other metal material or the like except for them, because the core section 201 is more resistant to swelling and shrinkage during charge and discharge. For example, as the metal material or the like, one or more kinds selected from boron (B), magnesium, calcium, titanium (Ti), vanadium (V), manganese, cobalt (Co), copper, germanium (Ge), yttrium (Y), zirconium (Zr), molybdenum (Mo), silver (Ag), indium (In), tin (Sn), antimony (Sb), tantalum (Ta), tungsten (W), lead (Pb), lanthanum (La), cerium (Ce), praseodymium (Pr) and neodymium (Nd) are used. The content (the atomic ratio excluding oxygen) of the metal material or the like is preferably within a range of 0.01 at % to 30 at % both inclusive, because a higher effect is obtained.

The composition of the above-described core section 201 including aluminum or the like is confirmed by, for example, EDX. Note that "atomic ratio excluding oxygen" means a ratio (atomic ratio) of a specific element in all elements configuring the core section 201 except for oxygen. For example, in the case where the core section 201 includes only aluminum, the aluminum content means the ratio (at %) of aluminum in silicon and aluminum.

In the case where, as described above, the core section 201 further includes, in addition to aluminum and the other metal material (such as chromium), the other metal material or the like (such as boron), the silicon content (the atomic ratio excluding oxygen) in the core section 201 is not specifically limited, but the silicon content is preferably within a range of 20 at % to 80 at % both inclusive, because while securing the capacity of an anode, the core section 201 is resistant to swelling and shrinkage during charge and discharge.

In the above-described core section 201 including aluminum or the like, the half-width (2θ) of a diffraction peak corresponding to (111) crystal plane of silicon obtained by X-ray diffraction is preferably 0.6° or over, and the crystallite size corresponding to the (111) crystal plane is preferably 90 nm or less. When the half-width is determined, it is preferable that the coating section 202 is dissolved with hydrofluoric acid or the like and removed, and then the core section 201 is analyzed.

In the case where the core section 201 does not include aluminum and is high-crystalline, as described above, the core section 201 is resistant to swelling and shrinkage during charge and discharge. On the other hand, in the case where the core section 201 includes a predetermined amount of aluminum, irrespective of whether the core section 201 is high-crystalline or low-crystalline, the core section 201 is resistant to swelling and shrinkage during charge and discharge. In this case, when the core section 201 is low-crystalline, in addition to preventing swelling and shrinkage of the core section 201, the diffusibility of lithium ions is improved.

In this case, the coating section 202 is preferably placed adjacent to the core section 201, but an intermediate film including a natural oxide film (silicon dioxide: $SiO_2$) may be arranged between the core section 201 and the coating section 202. The intermediate film is formed, for example, by oxidizing a part in proximity to a surface of the core section 201. As long as the core section 201 is present in the center of the anode active material particle 200 and the coating section 202 is present in an outer part of the anode active material particle 200, the presence of the intermediate film has little influence on the functions of the core section 201 and the coating section 202.

It is known that the amorphous silicon-based material ($SiO_y$) included in the coating section 202 has 5 kinds of bonding states (valence numbers) of silicon atoms to oxygen atoms including zero-valence ($Si^{0+}$), monovalence ($Si^{1+}$), divalence ($Si^{2+}$), trivalence ($Si^{3+}$) and tetravalence ($Si^{4+}$). The presence or absence of a silicon atom in each bonding state and the abundance ratio of the bonding states are allowed to confirmed, for example, by analyzing the silicon-based material by XPS. In the case where an outermost layer of the coating section 202 is oxidized (silicon dioxide is formed) without intention, it is preferable that silicon dioxide is dissolved with hydrofluoric acid or the like and removed, and then analyzed.

It is preferable that the amorphous silicon-based material ($SiO_y$: $0.5 \leq y \leq 1.8$) has all of the above-described bonding states of silicon atoms to oxygen atoms (5 kinds including zero-valence to tetravalence) and these bonding state are mixed, because compared to the case where the amorphous silicon-based material has some of the bonding states, the electrical resistance of the coating section 202 is reduced, and the protection function of the coating section 202 for the core section 201 is secured. More specifically, a zero-valent bonding state in which the valence number is the smallest tends to swell and shrink the core section 201 during charge and discharge to cause degradation in a chemical and physical protection function of the coating section 202 for the core section 201. Moreover, a tetravalent bonding state in which the valence number is the largest tends to increase the electrical resistance of the coating section 202. Therefore, to secure the protection function of the coating section 202 while reducing the electrical resistance of the coating section 202, it is preferable that the amorphous silicon-based material has monovalent to trivalent bonding states in addition to the zero-valent and tetravalent bonding states and the valent numbers (bonding states) are spread so as not to make the abundance ratios of the zero-valent and tetravalent bonding states too large.

The abundance ratio (atomic ratio) of the bonding states of silicon atoms is not specifically limited, because as long as the amorphous silicon-based material has 5 kinds of bonding states, the above-described advantages are obtained independent of the abundance ratio. In particular, the abundance ratio preferably satisfies a relationship of $Si^{0+} \leq Si^{1+}+Si^{2+}+Si^{3+}+Si^{4+}$, because the smaller the ratio of the zero-valent bonding state is, the more easily the protection function of the coating section 202 is fulfilled. Moreover, the abundance ratio preferably satisfies relationships of $Si^{1+} \leq Si^{3+}$, $Si^{2+} \leq Si^{3+}$, $Si^{1+} \leq Si^{4+}$ and $Si^{2+} \leq Si^{4+}$, because the larger the ratio of silicon atoms with a large valence number is, the more easily the protection function of the coating section 202 is fulfilled.

As described above, to secure the protection function of the coating section 202, the ratio of silicon atoms with a large valence number is preferably large. Therefore, the abundance ratio of the tetravalent bonding state in which the valence number is the largest is preferably 20 at % or over, and more preferably 30 at % or over.

The anode active material particles 200 each may further include an additional coating film which is applied to a part or a whole of a surface of the coating section 202, because the core section 201 is less likely to come into contact with an electrolytic solution. The additional coating film includes, for example, one kind or two or more kinds selected from carbon materials, metal materials and inorganic compounds. Examples of the carbon materials include graphite. Examples of the metal materials include iron, copper and aluminum. Examples of the inorganic compounds include silicon dioxide ($SiO_2$). In particular, a carbon material or a metal material with lower electrical resistance than the core section 201 and the coating section 202 is preferable, because the electrical resistance of the whole anode active material particles 200 is reduced.

As the anode binder, for example, one kind or two or more kinds of synthetic rubber or polymeric materials are used. Examples of synthetic rubber include styrene butadiene-based rubber, fluorine-based rubber and ethylene propylene diene. Examples of the polymeric materials include polyvinylidene fluoride, polyimide, polyamideimide, polyacrylic acid and lithium polyacrylate.

As an anode conductor, for example, one kind or two or more kinds of carbon materials such as graphite, carbon black, acetylene black and ketjen black are used. The anode conductor may be a metal, a conductive polymer or the like, as long as the metal, the conductive polymer or the like is a material having electrical conductivity.

In addition, if necessary, the anode active material layer 2 may include a carbon material as an additional anode active material, because the electrical resistance of the anode active material layer 2 is reduced, and the anode active material layer 2 is resistant to swelling and shrinkage during charge and discharge. Examples of the carbon material include graphitizable carbon, non-graphitizable carbon having the (002) plane with a surface separation of 0.37 nm or over, and graphite having the (002) plane with a surface separation of 0.34 nm or over. More specific examples include pyrolytic carbons, cokes, glass-like carbon fibers, an organic polymer compound fired body, activated carbon and carbon blacks. Cokes include pitch coke, needle coke, and petroleum coke. The organic polymer compound fired body is a material carbonized by firing a phenolic resin, a furan resin or the like at an appropriate temperature. The carbon material may have any of a fibrous shape, a spherical shape, a granular shape, and a scale-like shape. The content of the carbon material in the anode active material layer 2 is not specifically limited, but the content is preferably 60 wt % or less and more preferably within a range of 10 wt % to 60 wt % both inclusive.

Moreover, if necessary, the anode active material layer 2 may include, in addition to the above-described anode active material particles 200 including the core sections 201 and the coating sections 202, any other kind of anode active material particles. Examples of the other kind of anode active material particles include a material including one or both of silicon and tin as constituent elements (except for the above-described silicon-based materials), metal oxides and polymers. Examples of the material including one or both of silicon and tin as constituent elements include silicon compounds, silicon alloys, a simple substance of tin, tin compounds and tin alloys. Examples of the metal oxides include iron oxide, ruthenium oxide and molybdenum oxide. Examples of the polymers include polyacetylene, polyaniline and polypyrrole.

The anode active material layer 2 is formed by, for example, a coating method, a firing method (a sintering method) or a combination of two or more kinds of the methods. In the coating method, for example, anode active material particles are mixed with the anode binder or the like to form a mixture, and the mixture is dispersed in an organic solvent, and then coating with the mixture is performed. In the firing method, after coating is performed by the same steps as those in the coating method, the mixture is heated at a higher temperature than the melting point of the anode binder or the like. As the firing method, a known technique may be used.

Examples of the firing method include an atmosphere firing method, a reaction firing method, a hot press firing method and the like.

Method of Manufacturing Anode

The anode is manufactured by, for example, the following steps.

First, the particle (powdery) core section 201 including the silicon-based material ($SiO_x$: $0 \leq x < 0.5$) is obtained by, for example, a gas atomization method, a water atomization method or a melt-pulverization method. In the case where the core section 201 includes a metal material such as iron or aluminum, or the like, the metal material or the like is melted with row materials.

Next, the coating section 202 including the silicon-based material ($SiO_y$: $0.5 \leq y \leq 1.8$) is formed on a surface of the core section 201 by, for example, a vapor-phase growth method such as an evaporation method or a sputtering method. In the case where the silicon-based material is deposited by the vapor-phase growth method, the silicon-based material tends to become amorphous. In this case, the coating section 202 may be formed by depositing the silicon-based material on heating, or the coating section 202 may be formed and then heated to make the silicon-based material low-crystalline. For example, the level of low crystallinity is controlled depending on conditions such as a temperature and duration on heating. By this heating process, moisture in the coating section 202 is removed, and adhesion of the coating section 202 to the core section 201 is improved. When the coating section 202 is formed, the abundance ratio of the bonding states of the silicon atoms are controllable by adjusting the introduction amounts of oxygen ($O_2$), hydrogen ($H_2$) and the like into a chamber or adjusting the temperature of the core section 201. Therefore, the core section 201 is coated with the coating section 202 so as to obtain the anode active material particles 200.

In the case where the anode active material particles 200 are formed, the additional coating film may be formed on the surface of the coating section 202 by a vapor-phase growth method such as an evaporation method, a sputtering method or a chemical vapor deposition (CVD) method, a wet coating method, or the like.

In the case where the evaporation method is used, for example, the additional coating film is deposited by directly spraying steam to the surfaces of the anode active material particles 200. In the case where the sputtering method is used, for example, the additional coating film is deposited by a powder sputtering method while introducing an argon gas (Ar). In the case where the CVD method is used, for example, a gas formed by subliming a metal chloride and a mixed gas including hydrogen, nitrogen and the like are mixed so that the molar ratio of the metal chloride is 0.03 to 0.3, and then the gas is heated at 1000° C. or over to deposit the additional coating film on the surface of the coating section 202. In the case where the wet coating method is used, for example, an alkali solution is added to slurry including the anode active material particles 200 while adding a metal-containing solution to the slurry to form a metal hydroxide, and then reduction treatment by hydrogen is performed at 450° C. to deposit the additional coating film on the surface of the coating section 202. In addition, in the case where the carbon material is used as a material for forming the additional coating film, the anode active material particles 200 are charged into a chamber, and an organic gas is introduced into the chamber, and then heating treatment is performed under 10000 Pa and 1000° C. or over for 5 hours to deposit the additional coating film on the surface of the coating section 202. The kind of the organic gas is not specifically limited as long as the organic gas forms carbon by thermal decomposition, and examples of the organic gas include methane, ethane, ethylene, acetylene and propane.

Next, the anode active material particles 200 and other materials such as the anode binder are mixed to form an anode mixture, and then the anode mixture is dissolved in a solvent such as an organic solvent to form anode mixture slurry. Finally, the anode mixture slurry is applied to the surface of the anode current collector 1, and is dried to form the anode active material layer 2. After that, if necessary, anode active material layer 2 may be compression molded and heated (fired).

Functions and Effects of Embodiment

In the anode, the anode active material particles 200 each include the core section 201 and the coating section 202. The core section 201 includes the silicon-based material ($SiO_x$: $0 \leq x < 0.5$), and the coating section 202 includes the amorphous or low-crystalline silicon-based material ($SiO_y$: $0.5 \leq y \leq 1.8$). Therefore, lithium ions are smoothly inserted and extracted in the core section 201, and the core section 201 is protected by the coating section 202 so as not to expose a newly-formed surface during charge and discharge while maintaining smooth insertion and extraction. Accordingly, the anode is allowed to contribute to an improvement in performance of a lithium-ion secondary battery using the anode, more specifically improvements in cycle characteristics, initial charge-discharge characteristics and the like of the lithium-ion secondary battery.

In particular, in the low-crystalline silicon-based material in the coating section 202, when the average area proportion of crystal grains corresponding to (111) plane and (220) plane of silicon is 35% or less, or when the average particle diameter of the crystal grains is 55 nm or less, a higher effect is obtainable. Moreover, when, in the case where the coating section 202 is divided into two equal parts in a thickness direction, the above-described average area proportions and the above-described average particle diameters of crystal grains in an inner part is equal to or larger than those of crystal grains in an outer part, or when the coating section 202 is configured of a plurality of layers, a higher effect is obtained.

Moreover, when the half-width (2θ) of a diffraction peak corresponding to (111) crystal plane of silicon obtained by X-ray diffraction in the core section 201 is 20° or less, and the crystallite size is 10 nm or over, a higher effect is obtainable.

Further, when the median diameter of the core section 201 is within a range of 0.5 μm to 20 μm both inclusive, or when the core section 201 includes 0.01 wt % or over of iron, a higher effect is obtainable. Even in the case where the average thickness of the coating section 202 is within a range of 1 nm to 5000 nm both inclusive, or the average coverage of the coating section 202 is 30% or over, a higher effect is obtainable.

When the anode current collector 1 includes 100 ppm or less of carbon and sulfur, a higher effect is obtainable.

When the core section 201 includes a predetermined amount of a metal material such as aluminum, or the like, a higher effect is obtainable. In this case, in particular, the anode is allowed to contribute to improvements in not only the cycle characteristics and the initial charge-discharge characteristics but also load characteristics. In addition, when the silicon content in the core section 201 is within a range of 20 at % to 80 at % both inclusive, or when the half-width (2θ) of a diffraction peak corresponding to (111) crystal plane of silicon obtained by X-ray diffraction in the core section 201 is 20° or less and the crystallite size is 10 nm or over, a higher effect is obtainable.

Moreover, when the bonding state of silicon atoms to oxygen atoms in the amorphous silicon-based material in the coating section 202 is a mixed state of zero-valence to tetravalence, the protection function of the coating section 202 for the core section 201 is allowed to be secured while reducing the electrical resistance of the coating section 202. In this case, when the abundance ratio (atomic ratio) of the bonding states satisfies a relationship of $Si^{0+} \leq Si^{1+} + Si^{2+} + Si^{3+} + Si^{4+}$ or relationships of $Si^{1+} \leq Si^{3+}$, $Si^{2+} \leq Si^{3+}$, $Si^{1+} \leq Si^{4+}$ and $Si^{2+} \leq Si^{4+}$, a higher effect is obtainable. The same holds true even in the case where the abundance ratio of the tetravalent bonding state is 20 at % or over, preferably 30 at % or over.

Further, when the anode active material particles 200 each include the additional coating film with lower electrical resistance than the electrical resistance of the core section 201 and the coating section 202, a higher effect is obtainable.

2. Lithium-Ion Secondary Battery

Next, lithium-ion secondary batteries using the above-described anode for lithium-ion secondary battery will be described below.

2-1. Prismatic Type

Figure 7:
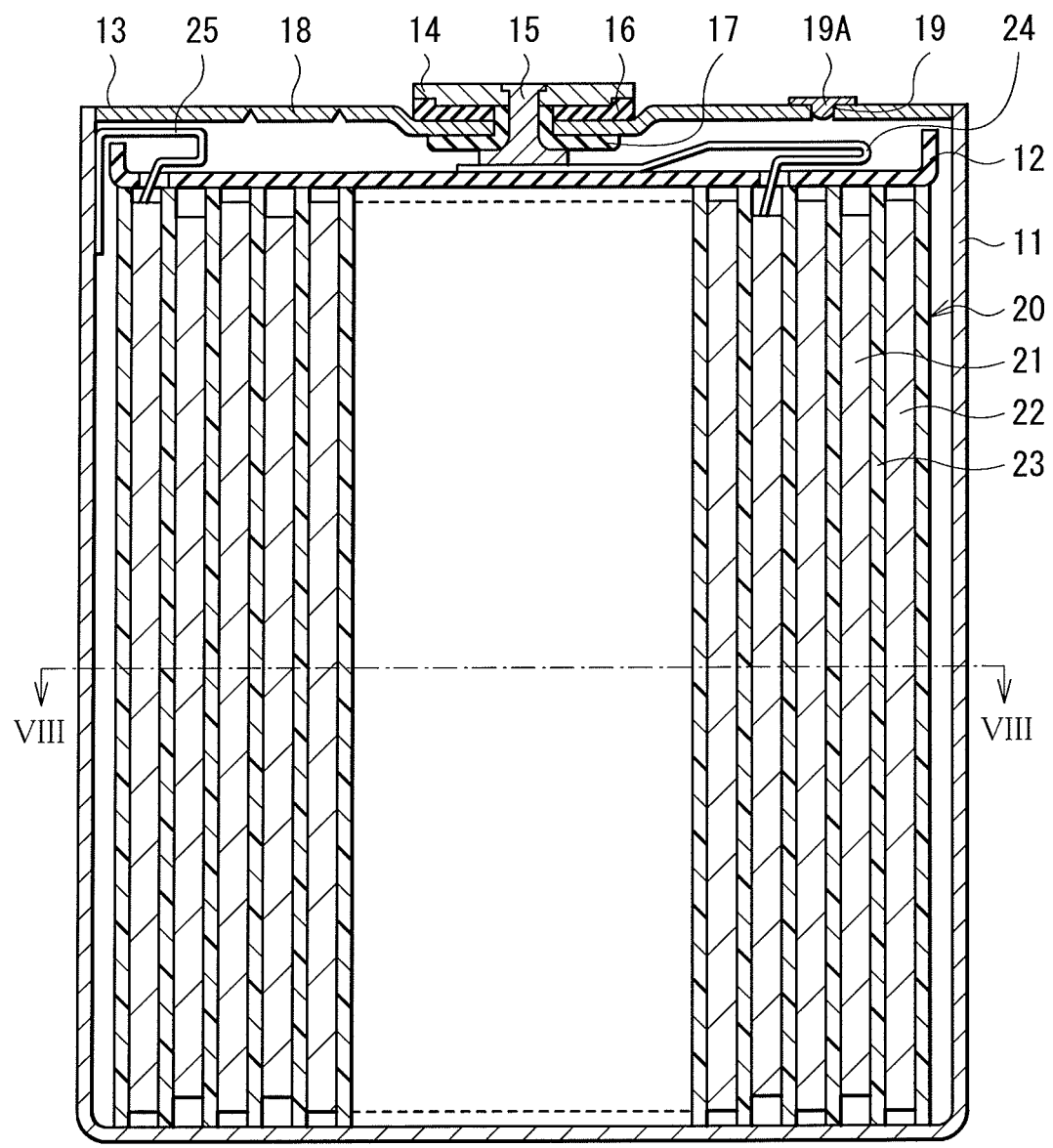
FIG. 7 is a sectional view illustrating a configuration of a prismatic type secondary battery using the anode for lithium-ion secondary battery according to the embodiment of the invention.
Figure 8:
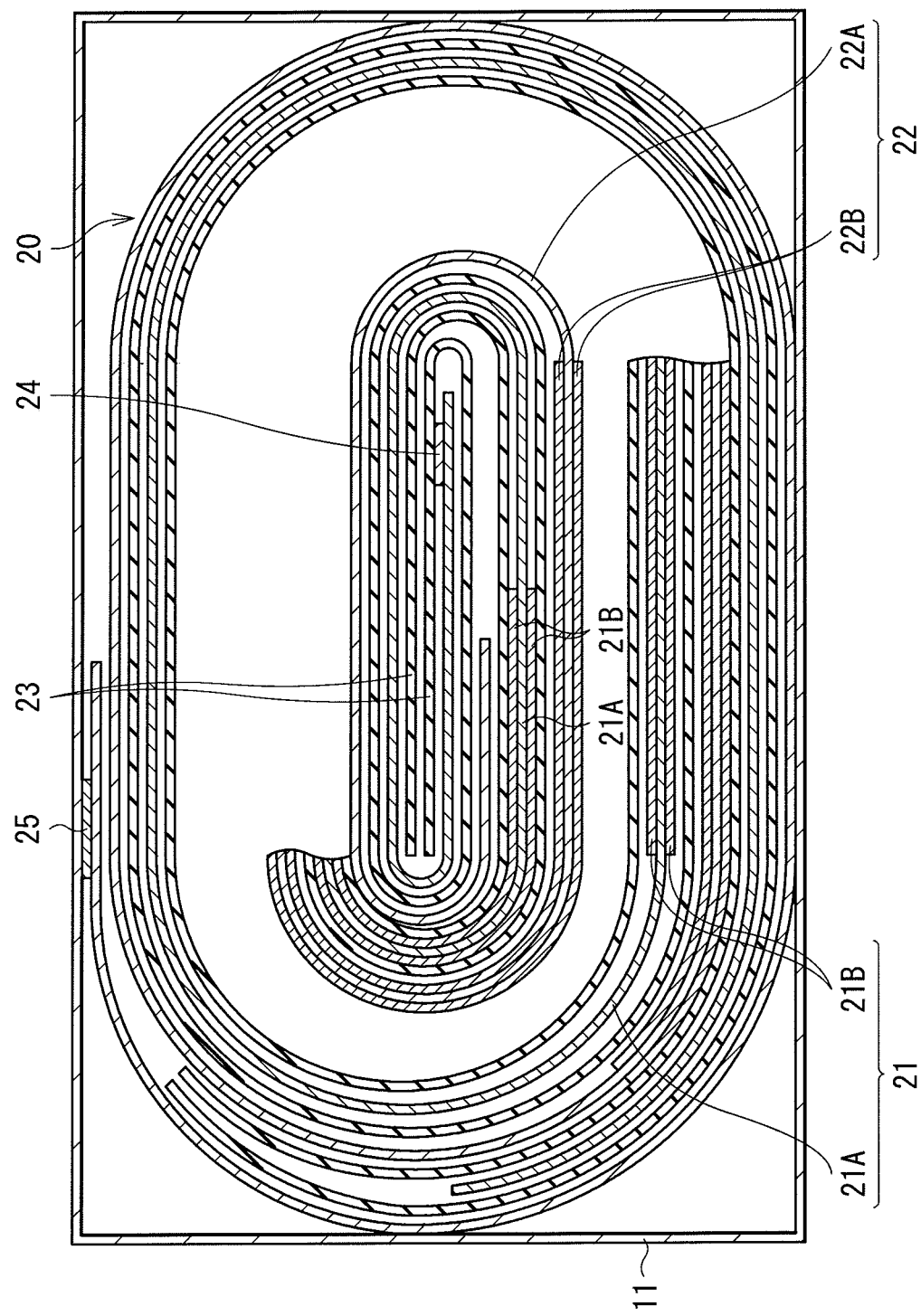
FIG. 8 is a sectional view taken along a line VIII-VIII of the prismatic type secondary battery illustrated in FIG. 7.
Figure 9:
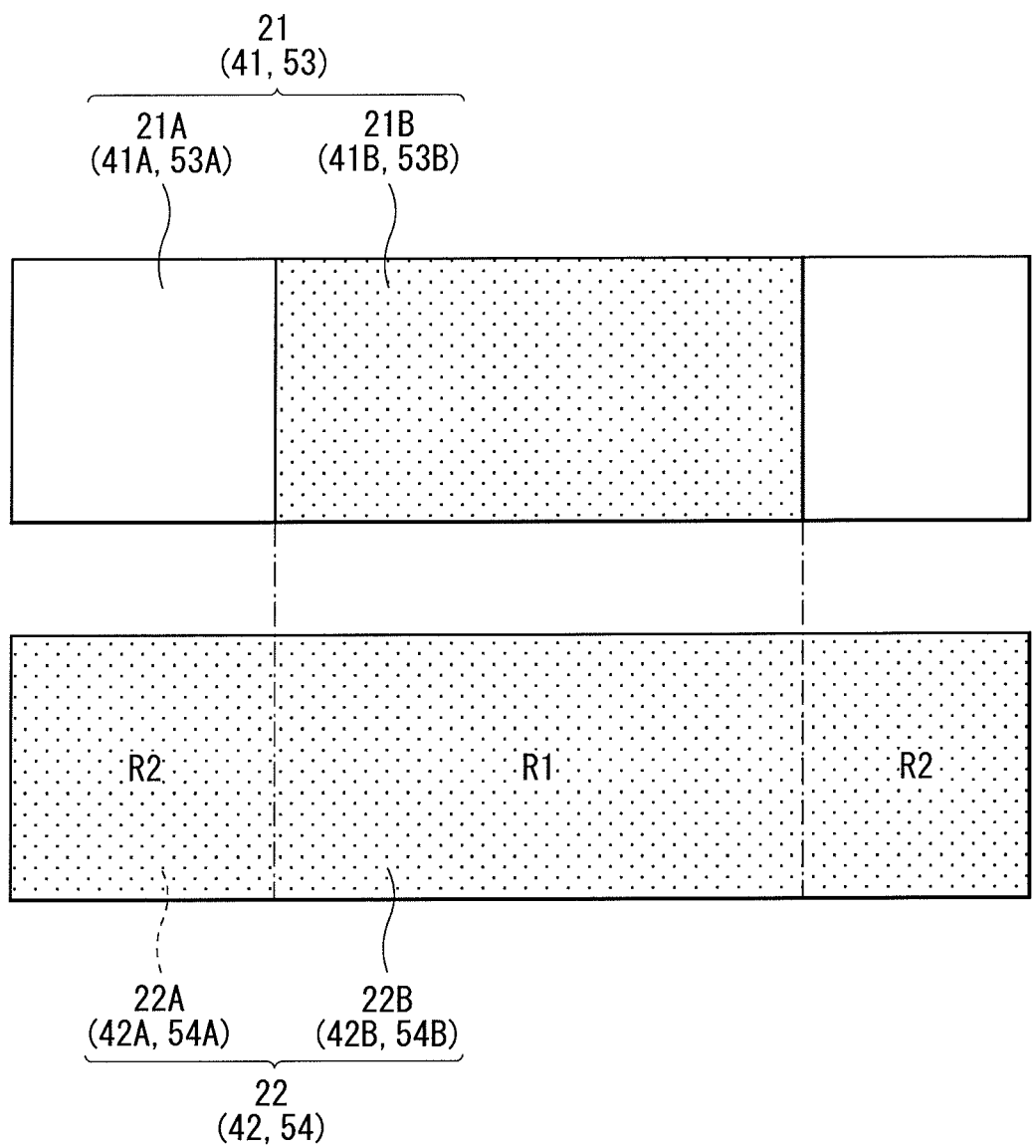
FIG. 9 is a schematic plan view illustrating configurations of a cathode and the anode illustrated in FIG. 8.

FIGS. 7 and 8 illustrate sectional configurations of a prismatic type secondary battery, and FIG. 8 illustrates a sectional view taken along a line VIII-VIII of FIG. 7. Moreover, FIG. 9 illustrates planar configurations of a cathode 21 and an anode 22 illustrated in FIG. 8.

Whole Configuration of Prismatic Type Secondary Battery

The prismatic type secondary battery is formed mainly by containing a battery element 20 in a battery can 11. The battery element 20 is a spirally wound laminate formed by laminating the cathode 21 and the anode 22 with a separator 23 in between and spirally winding them, and has a flat shape according to the shape of the battery can 11.

The battery can 11 is, for example, a prismatic package member. As illustrated in FIG. 8, in the prismatic package member, a sectional surface in a longitudinal direction has a rectangular shape or a substantially rectangular shape (including a curve in part), and the prismatic package member is applicable to not only a prismatic battery with a rectangular shape but also a prismatic battery with an oval shape. In other words, the prismatic package member is a vessel-shaped member having a rectangular closed end or an oval closed end and an opening with a rectangular shape or a substantially rectangular (oval) shape formed by connecting arcs with straight lines. FIG. 8 illustrates the battery can 11 having a rectangular sectional surface.

The battery can 11 is made of, for example, a conductive material such as iron or aluminum or an alloy thereof, and may have a function as an electrode terminal. To prevent swelling of the battery can 11 during charge and discharge with use of the hardness (resistance to deformation) of the battery can 11, iron which is harder than aluminum is preferable. In the case where the battery can 11 is made of iron, iron may be plated with nickel or the like.

Moreover, the battery can 11 has a hollow configuration having an open end and a closed end, and the battery can 11 is sealed by an insulating plate 12 and a battery cover 13 attached to the open end. The insulating plate 12 is arranged between the battery element 20 and the battery cover 13, and the insulating plate 12 is made of an insulating material such as polypropylene. The battery cover 13 is made of, for example, the same material as that of the battery can 11, and may have a function as an electrode terminal as in the case of the battery can 11.

A terminal plate 14 which is a cathode terminal is arranged outside the battery cover 13, and the terminal plate 14 is electrically insulated from the battery cover 13 by an insulating case 16. The insulating case 16 is made of an insulating material such as polybutylene terephthalate. Moreover, a through hole is provided around the center of the battery cover 13, and a cathode pin 15 is inserted into the through hole so as to be electrically connected to the terminal plate 14 and to be electrically insulated from the battery cover 13 by a gasket 17. The gasket 17 is made of, for example, an insulating material, and its surface is coated with asphalt.

A cleavage valve 18 and an injection hole 19 are arranged around an edge of the battery cover 13. The cleavage valve 18 is electrically connected to the battery cover 13, and when an internal pressure in the secondary battery increases to a certain extent or higher due to an internal short circuit or external application of heat, the cleavage valve 18 is separated from the battery cover 13 to release the internal pressure. The injection hole 19 is filled with a sealing member 19A made of, for example, a stainless steel ball.

A cathode lead 24 made of a conductive material such as aluminum is attached to an end (for example, an inside end) of the cathode 21, and an anode lead 25 made of a conductive material such as nickel is attached to an end (for example, an outside end) of the anode 22. The cathode lead 24 is welded to an end of the cathode pin 15 and is electrically connected to the terminal plate 14. The anode lead 25 is welded and electrically connected to the battery can 11.

Cathode

The cathode 21 includes a cathode active material layer 21B on both surfaces of a cathode current collector 21A. However, the cathode active material layer 21B may be arranged on only one surface of the cathode current collector 21A.

The cathode current collector 21A is made of a conductive material such as aluminum, nickel or stainless.

The cathode active material layer 21B includes one kind or two or more kinds of cathode materials allowed to insert and extract lithium ions as cathode active materials, and may include any other material such as a cathode binder or a cathode conductor, if necessary. Details of the cathode binder and the cathode conductor are the same as the above-described details of the anode binder and the anode conductor.

As the cathode material, a lithium-containing compound is preferable, because a high energy density is obtained. Examples of the lithium-containing compound include a complex oxide including lithium and a transition metal element as constituent elements and a phosphate compound including lithium and a transition metal element as constituent elements. In particular, a compound including one or two or more kinds selected from the group consisting of cobalt, nickel, manganese and iron as transition metal elements is preferable, because a higher voltage is obtained. The complex oxide and the phosphate compound are represented by, for example, $Li_xM1O_2$ and $Li_yM2PO_4$, respectively. In the chemical formulas, M1 and M2 represent one or more kinds of transition metal elements. The values of x and y depend on a charge-discharge state of the battery, and are generally within a range of $0.05 \leq x \leq 1.10$ and $0.05 \leq y \leq 1.10$, respectively.

Examples of the complex oxide including lithium and a transition metal element include lithium-cobalt complex oxide ($Li_xCoO_2$), lithium-nickel complex oxide ($Li_xNiO_2$), and lithium-nickel-based complex oxide represented by a formula (1). Examples of the phosphate compound including lithium and a transition metal element include a lithium-iron phosphate compound ($LiFePO_4$), and a lithium-iron-manganese phosphate compound ($LiFe_{1-u}Mn_uPO_4$ (u<1)), because high battery capacity and good cycle characteristics are obtained. Note that the cathode material may be any material other than the above-described materials. Examples of the material includes a material represented by $Li_xM1O_2$ (where M1 is one or more kinds selected from the group consisting of nickel and M represented by the formula (1) (such as cobalt) (29 kinds of metal elements including nickel, cobalt and the like), x is x>1 and y is arbitrarily selected).

$$LiNi_{1-x}M_xO_2 \tag{1}$$

where M is one or more kinds selected from the group consisting of cobalt, manganese, iron, aluminum, vanadium, tin, magnesium, titanium, strontium, calcium, zirconium, molybdenum, technetium, ruthenium, tantalum, tungsten, rhenium, ytterbium, copper, zinc, barium, boron, chromium, silicon, gallium, phosphorus, antimony and niobium, and x is within a range of $0.005<x<0.5$.

In addition to the above-described materials, examples of the cathode material include an oxide, a bisulfide, a chalcogenide, and a conductive polymer. Examples of the oxide include titanium oxide, vanadium oxide and manganese dioxide. Examples of the bisulfide include titanium bisulfide and molybdenum sulfide. Examples of the chalcogenide include niobium selenide. Examples of the conductive polymer include sulfur, polyaniline and polythiophene.

Anode

The anode 22 has the same configuration as that of the above-described anode for lithium-ion secondary battery, and includes an anode active material layer 22B on both surfaces of an anode current collector 22A. The configurations of the anode current collector 22A and the anode active material layer 22B are the same as those of the anode current collector 1 and the anode active material layer 2, respectively. In the anode 22, the chargeable capacity of the anode material allowed to insert and extract lithium ions is preferably larger than the discharge capacity of the cathode 21, because lithium metal is prevented from being deposited without intention during charge and discharge.

As illustrated in FIG. 9, for example, the cathode active material layer 21B is arranged on a part (for example, a central region in a longitudinal direction) of a surface of the cathode current collector 21A. On the other hand, for example, the anode active material layer 22B is arranged on a whole surface of the anode current collector 22A. Therefore, the anode active material layer 22B is arranged in a region (an opposed region R1) opposed to the cathode active material layer 21B and a region (a non-opposed region R2) not opposed to the cathode active material layer 21B in the anode current collector 22A. In this case, whereas a part arranged in the opposed region R1 of the anode active material layer 22B is involved in charge and discharge, a part arranged in the non-opposed region R2 of the anode active material layer 22B is hardly involved in charge and discharge. Note that in FIG. 9, shaded areas indicate the cathode active material layer 21B and the anode active material layer 22B.

As described above, the anode active material particles included in the anode active material layer 22B each include a core section ($SiO_x$: $0 \leq x<0.5$) and a low-crystalline coating section ($SiO_y$: $0.5 \leq y \leq 1.8$). However, there is a possibility that the anode active material layer 22B is deformed or broken due to swelling and shrinkage during charge and discharge; therefore, the formation states of the core section and the coating section may be changed from states at the time of formation of the anode active material layer 22B. However, in the non-opposed region R2, the formation state of the anode active material layer 22B is hardly affected by charge and discharge and is maintained; therefore, the presence or absence of the core section and the coating section, compositions of the core section and the coating section, and the like are preferably examined in the anode active material layer 22B in the non-opposed region R2, because the presence or absence of the core section and the coating section, compositions of the core section and the coating section, and the like are allowed to be reproducibly and accurately examined independent of charge-discharge history (such as the presence or absence of charge and discharge and the number of times of charge and discharge). The same applies to the case where the abundance ratio of the bonding states of silicon atoms is examined.

The maximum utilization ratio in a fully-charged state of the anode 22 (hereinafter simply referred to as "anode utilization ratio") is not specifically limited, and is allowed to be arbitrarily set according to the ratio of the capacity of the cathode 21 and the capacity of the anode 22.

The above-described "anode utilization ratio" is represented by a utilization ratio $Z(\%)=(X/Y)\times 100$, where X is the insertion amount of lithium ions per unit area in the fully-charged state of the anode 22 and Y is the amount of lithium ions allowed to be electrochemically inserted per unit area of the anode 22.

The insertion amount X is allowed to be determined by the following steps. First, the secondary battery is charged to a fully-charged state, and then the secondary battery is disassembled, and a part (a test anode) opposed to the cathode 21 is cut from the anode 22. Next, an evaluation battery including metal lithium as an opposite electrode is assembled with use of the test anode. Finally, the evaluation battery is discharged to measure the discharge capacity at the time of initial discharge, and then the discharge capacity is divided by the area of the test anode to determine the insertion amount X. In this case, "discharge" means that a current flows in a direction where lithium ions are extracted from the test anode, and, for example, the battery is discharged at a constant current and a current density of 0.1 $mA/cm^2$ until the battery voltage reaches 1.5 V.

On the other hand, the insertion amount Y is determined, for example, by charging the above-described discharged evaluation battery at a constant current and a constant voltage until the battery voltage reaches 0 V and measuring the charge capacity, and then dividing the charge capacity by the area of the test anode. In this case, "charge" means that a current flows in a direction where lithium ions are inserted into the test anode, and, for example, the battery is charged at a current density of 0.1 $mA/cm^2$ and a constant battery voltage of 0 V until the current density reaches 0.02 $mA/cm^2$.

In particular, the anode utilization ratio is preferably within a range of 35% to 80% both inclusive, because good cycle characteristics, initial charge-discharge characteristics and load characteristics are obtained.

Separator

The separator 23 isolates between the cathode 21 and the anode 22 so that lithium ions pass therethrough while preventing a short circuit of a current due to contact between the cathode 21 and the anode 22. The separator 23 is configured of, for example, a porous film of a synthetic resin or ceramic, and may be configured of a laminate film formed by laminating two or more kinds of porous films. Examples of the synthetic resin include polytetrafluoroethylene, polypropylene and polyethylene.

Electrolytic Solution

The separator 23 is impregnated with an electrolytic solution which is a liquid electrolyte. The electrolytic solution is formed by dissolving an electrolyte salt in a solvent, and may include any other material such as an additive, if necessary.

The solvent includes, for example, one kind or two or more kinds of nonaqueous solvents such as organic solvents. Examples of the nonaqueous solvent include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate and dimethyl sulfoxide, because good battery capacity, cycle characteristics and storage characteristics are obtained.

In particular, one or more kinds selected from the group consisting of ethylene carbonate, propylene carbonate, dimethyl carbonate, diethyl carbonate and ethyl methyl carbonate are preferable, because superior characteristics are obtained. In this case, a mixture of a high-viscosity (high dielectric constant) solvent (for example, specific inductive $\in$≥30) such as ethylene carbonate or propylene carbonate and a low-viscosity solvent (for example, viscosity≤1 mPa·s) such as dimethyl carbonate, ethyl methyl carbonate or diethyl carbonate is more preferable, because the dissociation property of the electrolyte salt and ion mobility are improved.

In particular, the nonaqueous solvent preferably includes one or both of a halogenated chain carbonate and a halogenated cyclic carbonate, because a stable coating film is formed on a surface of the anode 22 during charge and discharge; therefore, the decomposition reaction of the electrolytic solution is prevented. The halogenated chain carbonate is a chain carbonate including a halogen as a constituent element (in which one or more hydrogen atoms are substituted with a halogen atom). The halogenated cyclic carbonate is a cyclic carbonate including a halogen as a constituent element (in which one or more hydrogen atoms are substituted with a halogen atom).

The kind of halogen is not specifically limited, but fluorine, chlorine or bromine is preferable, and fluorine is more preferable, because a higher effect than that of other halogens is obtained. The number of halogen atoms is more preferably 2 than 1, and may be 3 or over, because a capability of forming a protective film is improved, and a firmer and stabler coating film is formed, so the decomposition reaction of the electrolytic solution is further prevented.

Examples of the halogenated chain carbonate include fluoromethyl methyl carbonate, bis(fluoromethyl)carbonate and difluoromethyl methyl carbonate. Examples of the halogenated cyclic carbonate include 4-fluoro-1,3-dioxolane-2-one and 4,5-difluoro-1,3-dioxolane-2-one. In the halogenated cyclic carbonate, a geometric isomer is included. The contents of the halogenated chain carbonate and the halogenated cyclic carbonate in the nonaqueous solvent is, for example, within a range of 0.01 wt % to 50 wt % both inclusive.

Moreover, the nonaqueous solvent preferably includes an unsaturated carbon bond cyclic carbonate, because a stable coating film is formed on a surface of the anode 22 during charge and discharge; therefore, the decomposition reaction of the electrolytic solution is prevented. The unsaturated carbon bond cyclic carbonate is a cyclic carbonate having an unsaturated carbon bond (in which an unsaturated carbon bond is introduced into a part). Examples of the unsaturated carbon bond cyclic carbonate include vinylene carbonate and vinyl ethylene carbonate. The content of the unsaturated carbon bond cyclic carbonate in the nonaqueous solvent is, for example, within a range of 0.01 wt % to 10 wt % both inclusive.

Further, the nonaqueous solvent preferably includes a sultone (a cyclic sulfonate), because chemical stability of the electrolytic solution is improved. Examples of the sultone include propane sultone and propene sultone. The content of the sultone in the nonaqueous solvent is, for example, within a range of 0.5 wt % to 5 wt % both inclusive.

Moreover, the nonaqueous solvent preferably includes an acid anhydride, because chemical stability of the electrolytic solution is improved. Examples of the acid anhydride include a carboxylic anhydride, a disulfonic anhydride and an anhydride of a carboxylic acid and a sulfonic acid. Examples of the carboxylic anhydride include succinic anhydride, glutaric anhydride and maleic anhydride. Examples of the disulfonic anhydride include ethanedisulfonic anhydride and propanedisulfonic anhydride. Examples of the anhydride of a carboxylic acid and a sulfonic acid include sulfobenzoic anhydride, sulfopropionic anhydride and sulfobutyric anhydride. The content of the acid anhydride in the nonaqueous solvent is, for example, within a range of 0.5 wt % to 5 wt % both inclusive.

The electrolyte salt includes, for example, one kind or two or more kinds selected from light metal salts such as lithium salt. Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenyl borate ($LiB(C_6H_5)_4$), lithium methanesulfonate ($LiCH_3SO_3$), trifluoromethane sulfonic lithium ($LiCF_3SO_3$), lithium tetrachloroaluminate ($LiAlCl_4$), lithium silicate hexafluoride ($Li_2SiF_6$), lithium chloride (LiCl) and lithium bromide (LiBr), because good battery capacity, cyclic characteristics, storage characteristics and the like are obtained.

In particular, one kind or two or more kinds selected from the group consisting of lithium hexafluorophosphate, lithium tetrafluoroborate, lithium perchlorate and lithium hexafluoroarsenate are preferable. More specifically, lithium hexafluorophosphate and lithium tetrafluoroborate are preferable, and lithium hexafluorophosphate is more preferable, because internal resistance is reduced to thereby obtain superior characteristics.

The content of the electrolyte salt is preferably within a range of 0.3 mol/kg to 3.0 mol/kg both inclusive relative to the solvent, because high ionic conductivity is obtained.

Operation of Prismatic Type Secondary Battery

When the prismatic secondary battery is charged, for example, lithium ions extracted from the cathode 21 are inserted into the anode 22 through the electrolytic solution. On the other hand, when the prismatic type secondary battery is discharged, for example, lithium ions extracted from the anode 22 are inserted into the cathode 21 through the electrolytic solution.

Method of Manufacturing Prismatic Type Secondary Battery

The secondary battery is manufactured by, for example, the following steps.

First of all, the cathode 21 is formed. First, the cathode active material and, if necessary, the cathode binder, the cathode conductor and the like are mixed to form a cathode mixture, and then the cathode mixture is dispersed in an organic solvent or the like to form paste-form cathode mixture slurry. Next, the cathode mixture slurry is applied to the cathode current collector 21A by a coating apparatus such as a doctor blade or a bar coater, and the cathode mixture slurry is dried to form the cathode active material layer 21B. Finally, the cathode active material layer 21B is compression molded by a roller press or the like while applying heat, if necessary. In this case, compression molding may be repeated a plurality of times.

Next, the anode active material layer 22B is formed on the anode current collector 22A by the same forming steps as the steps of forming the above-described anode for lithium-ion secondary battery to form the anode 22.

Next, the battery element 20 is formed. First, the cathode lead 24 and the anode lead 25 are attached to the cathode current collector 21A and the anode current collector 22A, respectively, by a welding method or the like. Then, the cathode 21 and the anode 22 are laminated with the separator 23 in between, and they are spirally wound in a longitudinal direction to form a spirally wound body. Finally, the spirally wound body is molded so as to have a flat shape.

Finally, the prismatic type secondary battery is assembled. First, the battery element 20 is contained in the battery can 11, and then the insulating plate 12 is placed on the battery element 20. Next, the cathode lead 24 and the anode lead 25 are attached to the cathode pin 15 and the battery can 11, respectively, by a welding method or the like. In this case, the battery cover 13 is fixed to an open end of the battery can 11 by a laser welding method or the like. Finally, the electrolytic solution is injected into the battery can 11 from the injection hole 19 so as to impregnate the separator 23 with the electrolytic solution, and then the injection hole 19 is sealed with the sealing member 19A.

Functions and Effects of Prismatic Type Secondary Battery

In the prismatic type secondary battery, as the anode 22 has the same configuration as that of the above-described anode for lithium-ion secondary battery, the decomposition reaction of the electrolytic solution during charge and discharge is prevented. Therefore, cycle characteristics and initial charge-discharge characteristics are allowed to be improved. Other effects are the same as those of the anode for lithium-ion secondary battery.

2-2. Cylindrical Type

Figure 10:
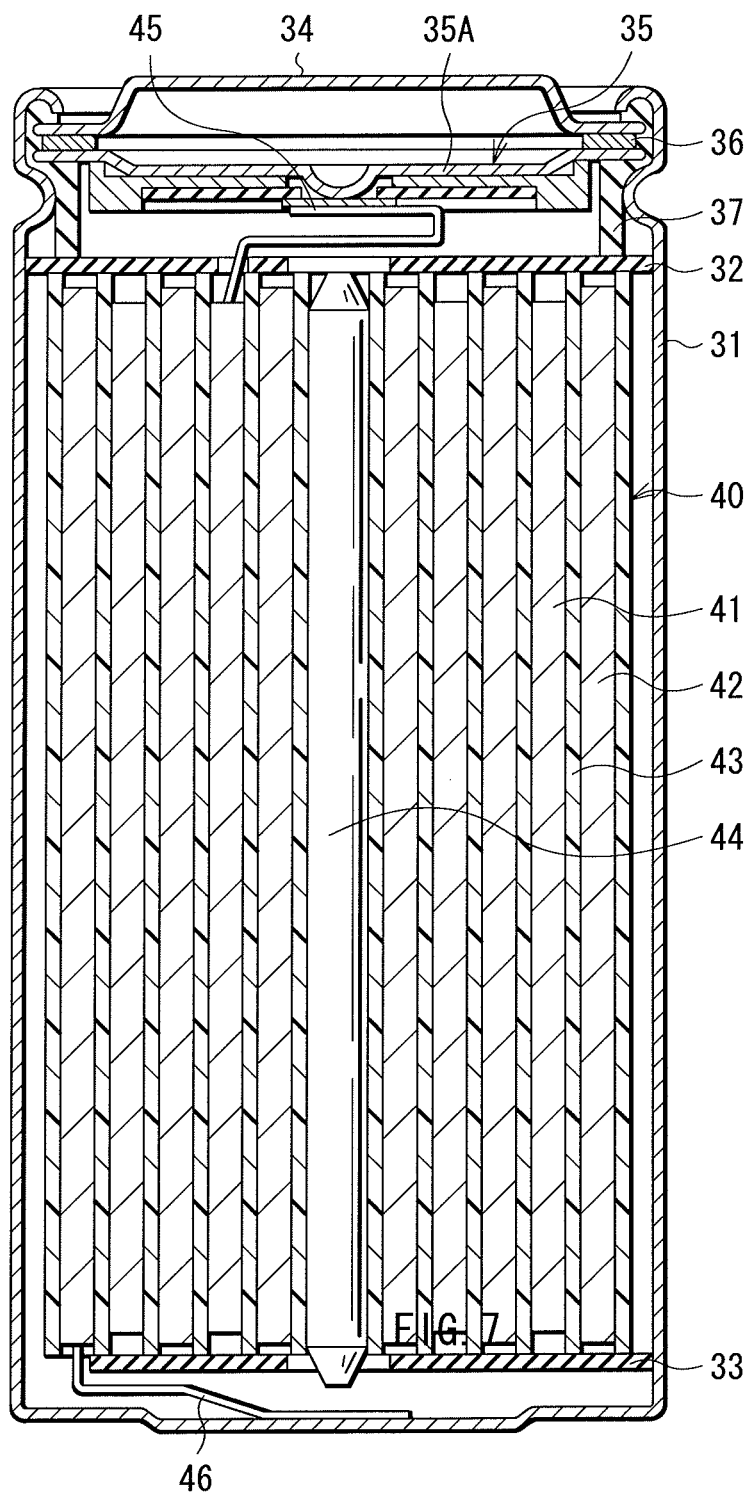
FIG. 10 is a sectional view illustrating a configuration of a cylindrical type secondary battery using the anode for lithium-ion secondary battery according to the embodiment of the invention.
Figure 11:
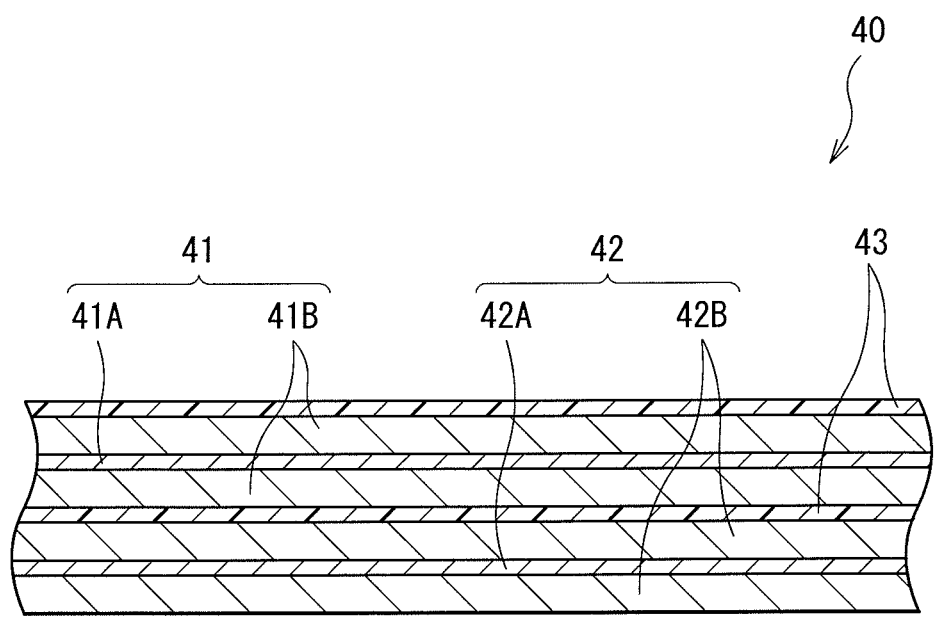
FIG. 11 is an enlarged sectional view illustrating a part of a spirally wound electrode body illustrated in FIG. 10.

FIGS. 10 and 11 illustrate sectional configurations of a cylindrical type secondary battery, and FIG. 11 illustrates an enlarged view of a part of a spirally wound electrode body 40 illustrated in FIG. 10. The cylindrical type secondary battery will be described below referring to components of the above-described prismatic type secondary battery as necessary.

Configuration of Cylindrical Type Secondary Battery

The cylindrical type secondary battery mainly includes the spirally wound electrode body 40 and a pair of insulating plates 32 and 33 which are contained in a substantially hollow cylindrical-shaped battery can 31. The spirally wound electrode body 40 is a spirally wound laminate formed by laminating and spirally winding a cathode 41 and an anode 42 with a separator 43 in between.

The battery can 31 has a hollow configuration in which an end of the battery can 31 is closed and the other end thereof is opened, and the battery can 31 is made of, for example, the same material as that of the battery can 11. The pair of insulating plates 32 and 33 are arranged so that the spirally wound electrode body 40 is sandwiched therebetween at the top and the bottom of the spirally wound electrode body 40, and the pair of insulating plates 32 and 33 extend in a direction perpendicular to a peripheral winding surface.

In the open end of the battery can 31, a battery cover 34, and a safety valve mechanism 35 and a positive temperature coefficient device (PTC device) 36 are caulked by a gasket 37, and the battery can 31 is sealed. The battery cover 34 is made of, for example, the same material as that of the battery can 31. The safety valve mechanism 35 and the PTC device 36 are arranged inside the battery cover 34, and the safety valve mechanism 35 is electrically connected to the battery cover 34 through the PTC device 36. In the safety valve mechanism 35, when an internal pressure in the secondary battery increases to a certain extent or higher due to an internal short circuit or external application of heat, a disk plate 35A is flipped so as to disconnect the electrical connection between the battery cover 34 and the spirally wound electrode body 40. The PTC device 36 increases resistance with an increase in temperature to prevent abnormal heat generation caused by a large current. The gasket 37 is made of, for example, an insulating material, and its surface may be coated with asphalt.

A center pin 44 may be inserted into the center of the spirally wound electrode body 40. A cathode lead 45 made of a conductive material such as aluminum is connected to the cathode 41, and an anode lead 46 made of a conductive material such as nickel is connected to the anode 42. The cathode lead 45 is electrically connected to the battery cover 34 by welding or the like to the safety valve mechanism 35, and the anode lead 46 is electrically connected to the battery can 31 by welding or the like.

The cathode 41 includes, for example, a cathode active material layer 41B on both surfaces of a cathode current collector 41A. The anode 42 has the same configuration as that of the above-described anode for lithium-ion secondary battery, and includes, for example, an anode active material layer 42B on both surfaces of an anode current collector 42A. The configurations of the cathode current collector 41A, the cathode active material layer 41B, the anode current collector 42A, the anode active material layer 42B and the separator 43 are the same as those of the cathode current collector 21A, the cathode active material layer 21B, the anode current collector 22A, the anode active material layer 22B and the separator 23, respectively. Moreover, the composition of the electrolytic solution with which the separator 35 is impregnated is the same as that of the electrolytic solution in the prismatic type secondary battery.

Operation of Cylindrical Type Secondary Battery

When the cylindrical type secondary battery is charged, for example, lithium ions extracted from the cathode 41 are inserted into the anode 42 through the electrolytic solution. On the other hand, when the cylindrical type secondary battery is discharged, for example, lithium ions extracted from the anode 42 are inserted into the cathode 41 through the electrolytic solution.

Method of Manufacturing Cylindrical Type Secondary Battery

The cylindrical type secondary battery is manufactured by, for example, the following steps. First, by the same steps as the steps of forming the cathode 21 and the anode 22, the cathode active material layer 41B is formed on both surfaces of the cathode current collector 41A to form the cathode 41, and the anode active material layer 42B is formed on both surfaces of the anode current collector 42A to form the anode 42. Next, the cathode lead 45 and the anode lead 46 are attached to the cathode 41 and the anode 42, respectively, by a welding method or the like. Then, the cathode 41 and the anode 42 are laminated with the separator 43 in between and are spirally wound to form the spirally wound electrode body 40, and then the center pin 44 is inserted into the center of the spirally wound electrode body 40. Next, the spirally wound electrode body 40 sandwiched between the pair of insulating plates 32 and 33 is contained in the battery can 31. In this case, the cathode lead 45 and an end of the anode lead 46 are attached to the safety valve mechanism 35 and the battery can 31, respectively, by a welding method or the like. Next, the electrolytic solution is injected into the battery can 31, and the separator 43 is impregnated with the electrolytic solution. Finally, the battery cover 34, the safety valve mechanism 35 and the PTC device 36 are mounted in an open end of the battery can 31, and then they are caulked by the gasket 37.

Functions and Effects of Cylindrical Type Secondary Battery

In the cylindrical type secondary battery, the anode 42 has the same configuration as that of the above-described anode for lithium-ion secondary battery. Therefore, cycle characteristics and initial charge-discharge characteristics are allowed to be improved by the same reasons as those in the prismatic type secondary battery. Effects other than this are the same as those in the anode for lithium-ion secondary battery.

2-3. Laminate Film Type

Figure 12:
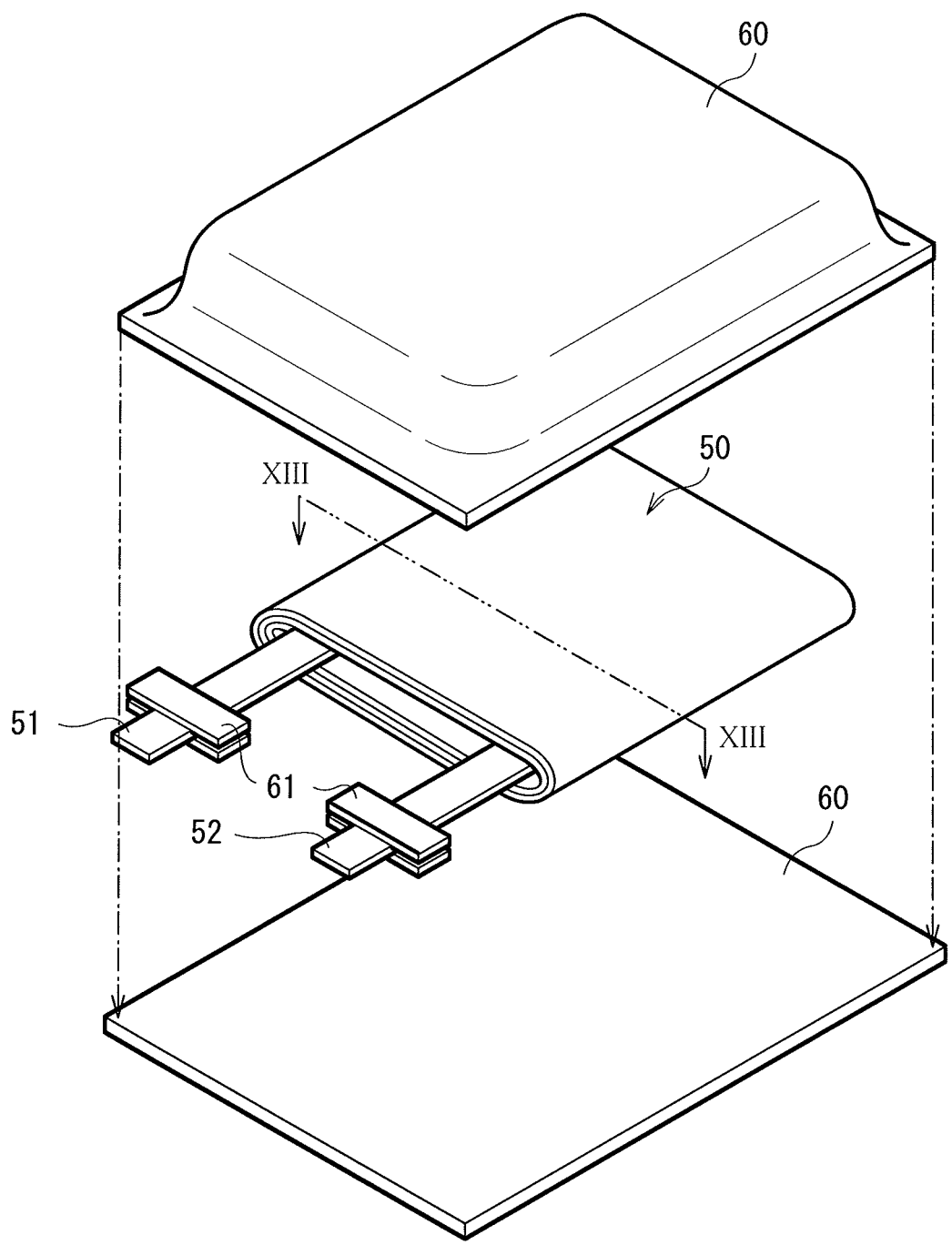
FIG. 12 is an exploded perspective view illustrating a configuration of a laminate film type secondary battery using the anode for lithium-ion secondary battery according to the embodiment of the invention.
Figure 13:
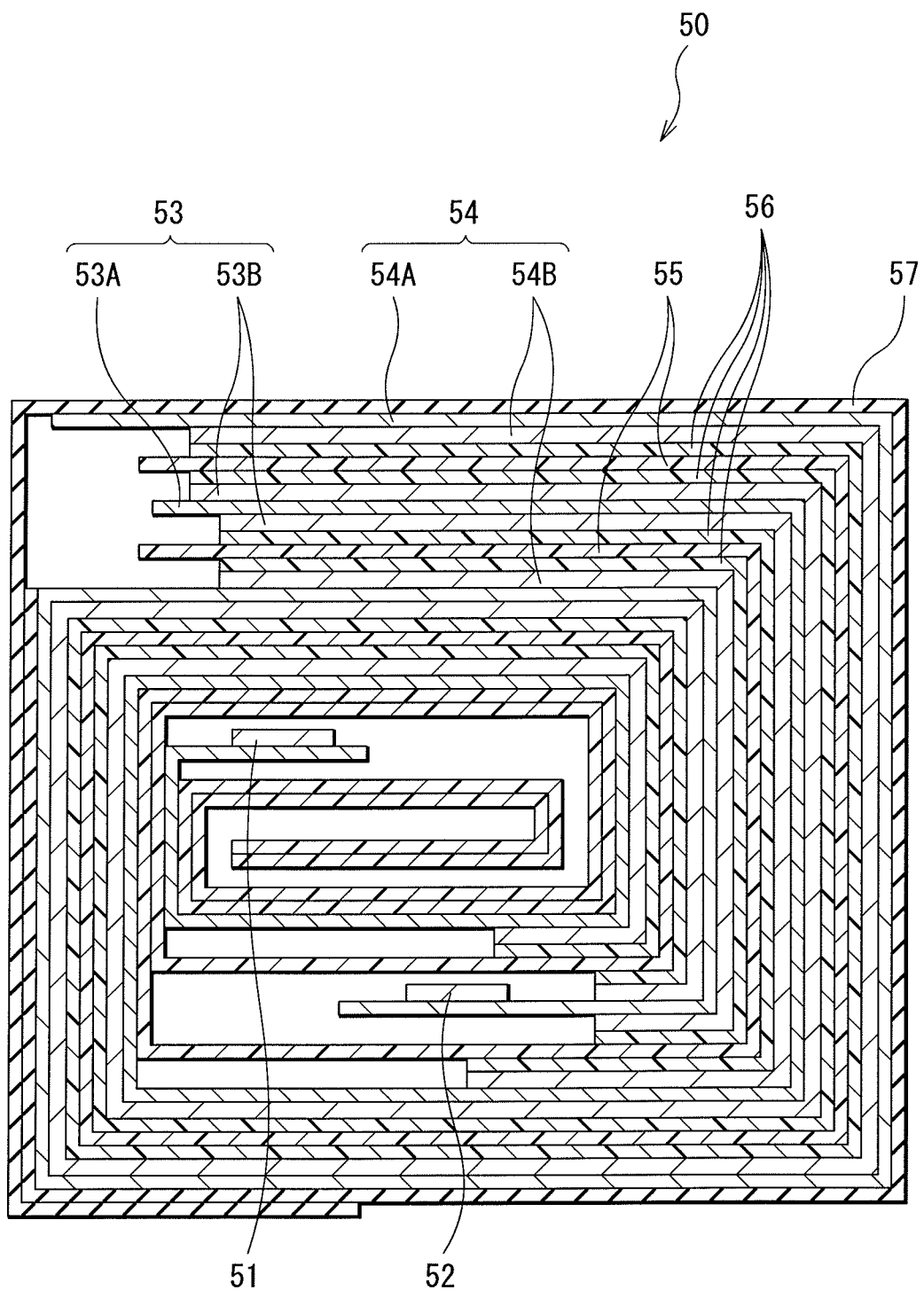
FIG. 13 is a sectional view taken along a line XIII-XIII of a spirally wound electrode body illustrated in FIG. 12.

FIG. 12 illustrates an exploded perspective configuration of a laminate film type secondary battery, and FIG. 13 illustrates an enlarged sectional view taken along a line XIII-XIII of a spirally wound electrode body 50 illustrated in FIG. 12.

Configuration of Laminate Film Type Secondary Battery

In the laminate film type secondary battery, the spirally wound electrode body 50 is mainly contained in film-shaped package members 60. The spirally wound electrode body 50 is a spirally wound laminate formed by laminating and spirally winding the cathode 53 and the anode 54 with a separator 55 and an electrolyte layer 56 in between. A cathode lead 51 and an anode lead 52 are attached to the cathode 53 and the anode 54, respectively. An outermost part of the spirally wound electrode body 50 is protected with a protective tape 57.

The cathode lead 51 and the anode lead 52 are drawn, for example, from the interiors of the package members 60 to outside in the same direction. The cathode lead 51 is made of a conductive material such as aluminum, and the anode lead 52 is made of a conductive material such as copper, nickel or stainless. These materials each have a sheet shape or a mesh shape.

The package members 60 are laminate films in which a bonding layer, a metal layer and a surface protection layer are laminated in this order. In the laminate films, for example, edge portions of the bonding layers of two laminate films are adhered to each other by fusion bonding or an adhesive so that the bonding layers face the spirally wound electrode body 50. The bonding layer is a film of polyethylene, polypropylene or the like. The metal layer is aluminum foil or the like. The surface protection layer is a film of nylon, polyethylene terephthalate or the like.

In particular, as the package members 60, aluminum laminate films each formed by laminating a polyethylene film, aluminum foil and a nylon film in this order are preferable. However, the package members 60 may be laminate films with any other laminate configuration or a polymer film of polypropylene or the like or a metal film.

Adhesive films 61 for preventing the entry of outside air are inserted between each package member 60 and the cathode lead 51 and between each package member 60 and the anode lead 52. The adhesive films 61 are made of, for example, a material having adhesion to the cathode lead 51 and the anode lead 52. Examples of such a material include polyolefin resins such as polyethylene, polypropylene, modified polyethylene and modified polypropylene.

The cathode 53 includes, for example, a cathode active material layer 53B on both surfaces of a cathode current collector 53A. The anode 54 has the same configuration as that of the above-described anode for lithium-ion secondary battery, and includes, for example, an anode active material layer 54B on both surfaces of an anode current collector 54A. The configurations of the cathode current collector 53A, the cathode active material layer 53B, the anode current collector 54A and the anode active material layer 54B are the same as those of the cathode current collector 21A, the cathode active material layer 21B, the anode current collector 22A and the anode active material layer 22B, respectively. Moreover, the configuration of the separator 55 is the same as that of the separator 23.

The electrolyte layer 56 is formed by holding an electrolytic solution by a polymer compound, and may include any other material such as an additive, if necessary. The electrolyte layer 56 is a so-called gel electrolyte. The gel electrolyte is preferable, because the gel electrolyte is allowed to obtain high ionic conductivity (for example, 1 mS/cm or over at room temperature), and leakage of the electrolytic solution from the battery is prevented.

As the polymer compound, for example, one kind or two or more kinds are selected from the following polymer materials. The polymer materials include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, poly(methyl methacrylate), polyacrylic acids, polymethacrylic acids, styrene-butadiene rubber, nitrile-butadiene rubber, polystyrene, polycarbonate and a copolymer of vinylidene fluoride and hexafluoropyrene. In particular, polyvinylidene fluoride or the copolymer of vinylidene fluoride and hexafluoropyrene is preferable, because they are electrochemically stable.

The composition of the electrolytic solution is, for example, the same as that of the electrolytic solution in the prismatic type secondary battery. However, in the electrolyte layer 56 which is a gel electrolyte, the solvent of the electrolytic solution means a wide concept including not only a liquid solvent but also a material having ionic conductivity which is allowed to dissociate an electrolyte salt. Therefore, in the case where a polymer compound having ionic conductivity is used, the polymer compound is included in the concept of the solvent.

Instead of the gel electrolyte layer 56, the electrolytic solution may be used as it is. In this case, the separator 55 may be impregnated with the electrolytic solution.

Operation of Laminate Film Type Secondary Battery

When the laminate film type secondary battery is charged, for example, lithium ions extracted from the cathode 53 are inserted into the anode 54 through the electrolyte layer 56. On the other hand, when the laminate film type secondary battery is discharged, for example, lithium ions extracted from the anode 54 are inserted into the cathode 53 through the electrolyte layer 56.

Method of Manufacturing Laminate Film Type Secondary Battery

The laminate film type secondary battery including the gel electrolyte layer 56 is manufactured by, for example, the following three kinds of methods.

In a first method, first, by the same steps as those in the above-described steps of forming the cathode 21 and the anode 22, the cathode 53 and the anode 54 are formed. In this case, the cathode active material layer 53B is formed on both surfaces of the cathode current collector 53A to form the cathode 53, and the anode active material layer 54B is formed on both surfaces of the anode current collector 54A to form the anode 54. Next, a precursor solution including the electrolytic solution, the polymer compound, the organic solvent and the like is prepared, and then the cathode 53 and the anode 54 are coated with the precursor solution to form the gel electrolyte layer 56. Next, the cathode lead 51 and the anode lead 52 are attached to the cathode current collector 53A and the anode current collector 54A, respectively, by a welding method or the like. Then, the cathode 53 on which the electrolyte layer 56 is formed and the anode 54 on which the electrolyte layer 56 is formed are laminated and spirally wound with the separator 55 in between to form the spirally wound electrode body 50, and then the protective tape 57 is bonded to an outermost part of the spirally wound electrode body 50. Finally, the spirally wound electrode body 50 is sandwiched between two film-shaped package members 60, and edge portions of the package members 60 are adhered to each other by a thermal fusion bonding method or the like to seal the spirally wound electrode body 50 in the package members 60. In this case, the adhesive films 61 are inserted between the cathode lead 51 and each package member 60 and between the anode lead 52 and each package member 60.

In a second method, first, the cathode lead 51 and the anode lead 52 are attached to the cathode 53 and the anode 54, respectively. Next, the cathode 53 and the anode 54 are laminated and spirally wound with the separator 55 in between to form a spirally wound body as a precursor body of the spirally wound electrode body 50, and then the protective tape 57 is bonded to an outermost part of the spirally wound body. Then, the spirally wound body is sandwiched between two film-shaped package members 60, and the edge portions of the package members 60 except for edge portions on one side are adhered by a thermal fusion bonding method or the like to contain the spirally wound body in the package members 60 configuring a pouched package. Next, an electrolytic composition which includes the electrolytic solution, monomers as materials of a polymer compound and a polymerization initiator and, if necessary, any other material such as a polymerization inhibitor is prepared, and is injected into the package members 60 configuring the pouched package, and then an opened portion of the pouched package configured of the package members 60 is sealed by a thermal fusion bonding method or the like. Finally, the monomers are polymerized by applying heat to form the polymer compound, and the gel electrolyte layer 56 is formed.

In a third method, as in the case of the above-described second method, the spirally wound body is formed, and the spirally wound body is contained in the package members 60 configuring the pouched package, except that the separator 55 having both surfaces coated with a polymer compound is used. Examples of the polymer compound applied to the separator 55 include polymers (a homopolymer, a copolymer, a multicomponent copolymer, and the like) including vinylidene fluoride as a component. More specifically, examples of the polymer compound include polyvinylidene fluoride, a binary copolymer including vinylidene fluoride and hexafluoropropylene as components, a ternary copolymer including vinylidene fluoride, hexafluoropropylene and chlorotrifluoroethylene as components. The polymer compound may include one kind or two or more kinds of other polymer compounds in addition to the polymer including vinylidene fluoride as a component. Next, the electrolytic solution is prepared, and injected into the package members 60, and then an opened portion of a pouched package configured of the package members 60 is sealed by a thermal fusion bonding method or the like. Finally, the package members 60 are heated while being weighted so that the separator 55 is brought into close contact with the cathode 53 and the anode 54 with the polymer compound in between. The polymer compound is thereby impregnated with the electrolytic solution, and the polymer compound is gelatinized to form the electrolyte layer 56.

In the third method, compared to the first method, swelling of the secondary battery is prevented. Moreover, in the third method, compared to the second method, monomers as the materials of the polymer compound, the organic solvent and the like hardly remain in the electrolyte layer 56, and a step of forming the polymer compound is controlled well; therefore, sufficient adhesion between the cathode 53, anode 54 and the separator 55, and the electrolyte layer 56 is obtained.

Functions and Effects of Laminate Film Type Secondary Battery

In the laminate film type secondary battery, the anode 54 has the same configuration as that of the above-described anode for lithium-ion secondary battery. Therefore, cycle characteristics and initial charge-discharge characteristics are allowed to be improved because of the same reasons as those in the prismatic type secondary battery. Effects other than this are the same as those in the anode for lithium-ion secondary battery.

3. Application of Lithium-Ion Secondary Battery

Next, application examples of the above-described lithium-ion secondary battery will be described below.

The application of the lithium-ion secondary battery is not specifically limited as long as the lithium-ion secondary battery is applied to machines, devices, appliances, apparatuses, systems (combinations of a plurality of devices) and the like which are allowed to use the lithium-ion secondary battery as a power supply for drive or a power storage source for accumulation of power. In the case where the lithium-ion secondary battery is used as a power supply, the power supply may be a main power supply (a power supply to be preferentially used) or an auxiliary power supply (a power supply to be used instead of the main power supply or by switching from the main power supply). The kind of the main power supply is not limited to the lithium-ion secondary battery.

The lithium-ion secondary battery is applied to, for example, the following applications. The applications include portable electronic devices such as video cameras, digital still cameras, cellular phones, notebook personal computers, cordless telephones, headphone stereos, portable radios, portable televisions and personal digital assistants (PDAs), portable home appliances such as electric shavers, memory devices such as backup power supplies and memory cards, power tools such as electric drills and electric saws, medical electronic devices such as pacemakers and hearing aids, vehicles such as electric vehicles (including hybrid vehicles), and energy storage system such as household battery systems storing power in case of emergency or the like. The lithium-ion secondary battery may be applied to any applications other than the above-described applications.

In particular, the lithium-ion secondary battery is effectively applied to the power tools, the electric vehicles, the energy storage systems and the like, because they need good battery characteristics (cycle characteristics, storage characteristics, load characteristics and the like), so when the lithium-ion secondary battery according to the embodiment of the invention is used, the characteristics are allowed to be effectively improved. Note that the power tools are tools having a moving part (such as a drill) which is movable by using the lithium-ion secondary battery as a power supply for drive. The electric vehicles are vehicles operating (running) by using the lithium-ion secondary battery as a power supply for drive, and as described above, the electric vehicles may include vehicles (such as hybrid vehicles) including a driving source in addition to the lithium-ion secondary battery. The energy storage systems are systems using the lithium-ion secondary battery as a power storage source. For example, in a household energy storage system, power is stored in the lithium-ion secondary battery which is a power storage source, and the power is consumed when necessary, so various devices such as home appliances are allowed to be used.

EXAMPLES

Examples of the invention will be described in detail below.

Experimental Examples 1-1 to 1-15 and 2-1 to 2-18

The laminate film type secondary batteries (in FIGS. 12 and 13) were formed by the following steps.

First of all, the cathode 53 was formed. First, 91 parts by mass of the cathode active material (lithium cobalt complex oxide: $LiCoO_2$), 6 parts by mass of the cathode conductor (graphite) and 3 parts by mass of the cathode binder (polyvinylidene fluoride: PVDF) were mixed to form a cathode mixture. Next, the cathode mixture was dispersed in the organic solvent (N-methyl-2-pyrrolidone: NMP) to form paste-form cathode mixture slurry. Then, the cathode mixture slurry was applied to both surfaces of the cathode current collector 53A by a coating apparatus, and the cathode mixture slurry was dried to form the cathode active material layer 53B. In this case, as the cathode current collector 53A, strip-shaped aluminum foil (with a thickness of 12 μm) was used. Finally, the cathode active material layer 53B was compression molded by a roller press. When the cathode active material layer 53B was formed, the thickness of the cathode active material layer 53B was adjusted so as to prevent lithium metal from being deposited on the anode 54 in a fully-charged state.

Next, the anode 54 was formed. First, a crystalline silicon-based material (the core section) was obtained by a gas atomization method, and then an amorphous silicon-based material (the coating section) was deposited on a surface of the crystalline silicon-based material by a powder evaporation method to obtain anode active material particles. In this case, as illustrated in Tables 1 and 2, the compositions of the silicon-based materials ($SiO_x$ and $SiO_y$) were changed. The core section had a half-width of 0.6°, a crystallite size of 90 nm and a median diameter of 4 μm, and the coating section had an average thickness of 500 nm and an average coverage of 70%. When the silicon-based material ($SiO_x$) was obtained, the introduction amount of oxygen was adjusted at the time of melting and solidifying a row material (silicon) to control the composition (an oxidation state). When the silicon-based material ($SiO_y$) was deposited, the introduction amount of oxygen or hydrogen was adjusted at the time of depositing a raw material (silicon) to control the composition. In the powder evaporation method, a deflective electron beam evaporation source was used, and the deposition rate was 2 nm/sec and pressure was brought in a vacuum state of $1 \times 10^{-3}$ Pa by a turbomolecular pump. Next, the anode active material particles and a precursor of an anode binder were mixed at a dry weight ratio of 80:20, and then the mixture was diluted with NMP to obtain paste-form anode mixture slurry. In this case, as a solvent of a polyamic acid, NMP and N,N-dimethylacetamide (DMAC) were used. Then, the anode mixture slurry was applied to both surfaces of the anode current collector 54A by a coating apparatus, and the anode mixture slurry was dried. As the anode current collector 54A, rolled copper foil (with a thickness=15 μm and a ten-point average roughness Rz<0.5 μm) was used. Finally, to enhance a bonding property, a coating film was hot-pressed, and then was fired in a vacuum atmosphere at 400° C. for 1 hour. Thus, the anode binder (polyimide) was formed, and the anode active material layer 54B including the anode active material particles and the anode binder was formed accordingly. When the anode active material layer 54B was formed, the thickness of the anode active material layer 54B was adjusted so that the anode utilization ratio was 65%.

Next, the solvents (ethylene carbonate (EC) and diethyl carbonate (DEC)) were mixed, and the electrolyte salt (lithium hexafluorophosphate: $LiPF_6$) was dissolved in the mixed solvent to prepare the electrolytic solution. In this case, the composition of the mixed solvent (EC:DEC) was 50:50 at a weight ratio, and the content of the electrolyte salt was 1 mol/kg relative to the solvent.

Finally, the secondary battery was assembled. First, the cathode lead 51 made of aluminum was welded to an end of the cathode current collector 53A, and the anode lead 52 made of nickel was welded to an end of the anode current collector 54A. Next, the cathode 53, the separator 55, the anode 54 and the separator 55 were laminated in this order and were spirally wound in a longitudinal direction to form a spirally wound body as a precursor body of the spirally wound electrode body 50, and then an outermost part of the spirally wound body was fixed by the protective tape 57 (an adhesive tape). In this case, as the separator 55, a laminate film (with a thickness of 20 μm) in which a film including porous polyethylene as a main component was sandwiched between films including porous polypropylene as a main component was used. Next, the spirally wound body was sandwiched between the package members 60, and then the edge portions of the package members 60 except for edge portions on one side were adhered by thermal fusion bonding to form a pouched package, and the spirally wound body was contained in the package members 60 configuring the pouched package. In this case, as the package members 60, aluminum laminate films each formed by laminating a nylon film (with a thickness of 30 μm), aluminum foil (with a thickness of 40 μm) and a cast polypropylene film (with a thickness of 30 μm) in order from outside were used. Next, the electrolytic solution was injected from an opened portion of the pouched package configured of the package members 60, and the separator 55 was impregnated with the electrolytic solution to form the spirally wound electrode body 50. Finally, the opened portion of the pouched package configured of the package members 60 was sealed by thermal fusion bonding in a vacuum atmosphere.

When the cycle characteristics and the initial charge-discharge characteristics of the secondary batteries were determined, results illustrated in Tables 1 and 2 were obtained.

To determine the cycle characteristics, first, one cycle of charge and discharge was performed on each of the secondary batteries in an atmosphere of 23° C. to stabilize its battery state, and then another cycle of charge and discharge was performed to determine the discharge capacity. Next, the cycle of charge and discharge was repeated until the total cycle number reached 100 cycles to determine the discharge capacity. Finally, a cycle retention ratio (%)=(discharge capacity in the 100th cycle/discharge capacity in the second cycle)×100 was determined by calculation. As the conditions of charge, each of the secondary batteries was charged at a constant current density of 3 mA/cm$^2$ until the voltage reached 4.2 V, and then each of the secondary batteries was charged at a constant voltage of 4.2 V until the current density reached 0.3 mA/cm$^2$. As the conditions of discharge, each of the secondary batteries was discharged at a constant current density of 3 mA/cm$^2$ until the voltage reached 2.5 V.

To determine the initial charge-discharge characteristics, one cycle of charge and discharge was performed on each of the secondary batteries to stabilize its battery state. Next, each of the secondary batteries was charged again to determine the charge capacity, and then each of the secondary batteries was discharged to determine the discharge capacity. Finally, initial efficiency (%)=(discharge capacity/charge capacity)×100 was determined by calculation. The atmospheric temperature and the conditions of charge and discharge were the same as those in the case where the cycle characteristics were determined

TABLE 1

| Table 1 | Anode Active Material Particle | | | | | | Cycle Retention Ratio (%) | Initial Efficiency (%) |
|---|---|---|---|---|---|---|---|---|
| | Core Section (Crystalline) | | | | Coating Section (Amorphous) | | | |
| | Kind | x | Half-width (°) | Crystallite Size (nm) | Kind | y | | |
| Experimental Example 1-1 | SiO$_x$ | 0 | 0.6 | 90 | SiO$_y$ | 1 | 83.6 | 85.5 |
| Experimental Example 1-2 | | 0.05 | | | | | 83.5 | 83.8 |
| Experimental Example 1-3 | | 0.1 | | | | | 83.5 | 82.6 |
| Experimental Example 1-4 | | 0.2 | | | | | 83.6 | 82.4 |
| Experimental Example 1-5 | | 0.3 | | | | | 83.5 | 81.8 |
| Experimental Example 1-6 | | 0.4 | | | | | 83.6 | 80.9 |
| Experimental Example 1-7 | | 0.45 | | | | | 83.4 | 80.2 |
| Experimental Example 1-8 | | 0.5 | | | | | 83.3 | 78.5 |
| Experimental Example 1-9 | | 0.6 | | | | | 82.9 | 75.6 |
| Experimental Example 1-10 | | 0.7 | | | | | 82.6 | 73.6 |
| Experimental Example 1-11 | | 0.8 | | | | | 82.5 | 71.9 |
| Experimental Example 1-12 | | 1 | | | | | 81.6 | 70.4 |
| Experimental Example 1-13 | | 1.2 | | | | | 80.5 | 68.5 |
| Experimental Example 1-14 | | 1.5 | | | | | 78.6 | 66.4 |
| Experimental Example 1-15 | | 1.8 | | | | | 75.3 | 61.1 |

TABLE 2

| Table 2 | Anode Active Material Particle | | | | | | Cycle Retention Ratio (%) | Initial Efficiency (%) |
|---|---|---|---|---|---|---|---|---|
| | Core Section (Crystalline) | | | | Coating Section (Amorphous) | | | |
| | Kind | x | Half-width (°) | Crystallite Size (nm) | Kind | y | | |
| Experimental Example 2-1 | SiO$_x$ | 0.1 | 0.6 | 90 | SiO$_y$ | 0.2 | 42 | 84 |
| Experimental Example 2-2 | | | | | | 0.3 | 46 | 83.7 |
| Experimental Example 2-3 | | | | | | 0.4 | 49 | 83.5 |
| Experimental Example 2-4 | | | | | | 0.5 | 81.2 | 83.2 |
| Experimental Example 2-5 | | | | | | 0.6 | 81.6 | 83.1 |
| Experimental Example 2-6 | | | | | | 0.7 | 81.8 | 83 |
| Experimental Example 2-7 | | | | | | 0.8 | 82.1 | 82.9 |
| Experimental Example 2-8 | | | | | | 0.9 | 82.4 | 82.8 |
| Experimental Example 1-3 | | | | | | 1 | 83.5 | 82.6 |
| Experimental Example 2-9 | | | | | | 1.1 | 83.1 | 82.4 |
| Experimental Example 2-10 | | | | | | 1.2 | 82.9 | 82.3 |
| Experimental Example 2-11 | | | | | | 1.3 | 82.6 | 82.1 |
| Experimental Example 2-12 | | | | | | 1.4 | 82.1 | 82 |
| Experimental Example 2-13 | | | | | | 1.5 | 82 | 81.9 |
| Experimental Example 2-14 | | | | | | 1.6 | 81.6 | 81.6 |
| Experimental Example 2-15 | | | | | | 1.7 | 80.9 | 81.5 |
| Experimental Example 2-16 | | | | | | 1.8 | 80.4 | 81.5 |
| Experimental Example 2-17 | | | | | | 1.9 | 71.2 | 81.4 |
| Experimental Example 2-18 | | | | | | 2 | 55.6 | 83.6 |

When the compositions of the crystalline core section and the amorphous coating section were changed, the cycle retention ratio and the initial efficiency were changed according to the compositions. In this case, when the composition of the core section (SiO$_x$) was 0≤x<0.5 and the composition of the coating section (SiO$_y$) was 0.5≤y≤1.8, a high cycle retention ratio and high initial efficiency were obtained. These results indicate the following. In the core section, the cycle retention ration and the initial efficiency are increased with a decrease in oxidation degree (the value of x), and the silicon-based material may be silicon oxide or a simple substance of silicon. On the other hand, in the coating section, when the oxidation degree (the value of y) is not too small and not too large, the cycle retention ratio and the initial efficiency are increased, and the silicon-based material is necessarily silicon oxide.

Experimental Examples 3-1 to 3-9

Secondary batteries were formed by the same steps as those in Experimental Example 1-3, except that as illustrated in Table 3, the physical properties (the half-width and the crystallite size) of the core section were changed, and various characteristics of the secondary batteries were determined. In this case, the crystallinity of the silicon-based material was controlled by adjusting the cooling temperature after melting the raw material (silicon).

TABLE 3

| Table 3 | Anode Active Material Particle | | | | | Cycle Retention Ratio (%) | Initial Efficiency (%) |
|---|---|---|---|---|---|---|---|
| | Core Section (Crystalline) | | | Coating Section (Amorphous) | | | |
| | Kind | x | Half-width (°) | Crystallite Size (nm) | Kind | y | | |
| Experimental Example 3-1 | SiO$_x$ | 0.1 | 0.4 | 130 | SiO$_y$ | 1 | 83.5 | 82.6 |
| Experimental Example 3-2 | | | 0.5 | 105 | | | 83.4 | 82.5 |
| Experimental Example 1-3 | | | 0.6 | 90 | | | 83.5 | 82.6 |
| Experimental Example 3-3 | | | 0.7 | 70 | | | 83.1 | 82.4 |
| Experimental Example 3-4 | | | 1 | 35 | | | 82.5 | 82.5 |
| Experimental Example 3-5 | | | 5 | 20 | | | 82 | 82.6 |
| Experimental Example 3-6 | | | 12 | 15 | | | 81.6 | 82.3 |
| Experimental Example 3-7 | | | 20 | 10 | | | 80.6 | 82.4 |
| Experimental Example 3-8 | | | 21 | 8.5 | | | 75.6 | 82.5 |
| Experimental Example 3-9 | | | 22 | 7.5 | | | 72.1 | 82.3 |

Even in the case where the physical properties of the core section were changed, a high cycle retention ratio and high initial efficiency were obtained, and in particular, when the half-width was 20° or less and the crystallite size was 10 nm or over, the cycle retention ratio and the initial efficiency were further increased.

Experimental Examples 4-1 to 4-25

Secondary batteries were formed by the same steps as those in Experimental Example 1-3, except that when the coating section was formed, the silicon-based material was deposited while being heated in an atmosphere of an argon gas to make the silicon-based material low-crystalline, and various characteristics of the secondary batteries were determined. In this case, the physical properties (an average area proportion, an average particle diameter, a magnitude relation and a layer configuration) of the coating section were changed as illustrated in Table 4 by adjusting a temperature and duration on heating. The magnitude relation is a magnitude relation in the average area proportion and the average particle diameter between an inner part and an outer part formed by dividing the coating section into two equal parts in a thickness direction, and the layer configuration indicates whether the coating section has a single-layer configuration or a multilayer configuration.

TABLE 4

| Table 4 | Anode Active Material Particle | | | | | | | | | | Cycle Retention Ratio (%) | Initial Efficiency (%) |
|---|---|---|---|---|---|---|---|---|---|---|---|---|
| | Core Section (Crystalline) | | | | Coating Section (Amorphous) | | | | | | | |
| | Kind | x | Half-width (°) | Crystallite Size (nm) | Kind | y | Average Area Proportion (%) | Average Particle Diameter (nm) | Magnitude Relation | Layer Configuration | | |
| Experimental Example 4-1 | SiO$_x$ | 0.1 | 0.6 | 90 | SiO$_y$ | 1 | 0.5 | 1.5 | Inner Part ≥ Outer Part | Multilayer | 83.3 | 82.6 |
| Experimental Example 4-2 | | | | | | | 1 | 3 | | | 83.1 | 82.8 |
| Experimental Example 4-3 | | | | | | | 2 | 10 | | | 83 | 82.9 |
| Experimental Example 4-4 | | | | | | | 3.5 | 12.5 | | | 82.8 | 82.9 |
| Experimental Example 4-5 | | | | | | | 5 | 14 | | | 82.5 | 83 |
| Experimental Example 4-6 | | | | | | | 7.5 | 15.5 | | | 82.2 | 83 |
| Experimental Example 4-7 | | | | | | | 10 | 17.5 | | | 81.9 | 83.1 |
| Experimental Example 4-8 | | | | | | | 15 | 20 | | | 81.5 | 83.1 |
| Experimental Example 4-9 | | | | | | | 20 | 22 | | | 81.1 | 83.1 |
| Experimental Example 4-10 | | | | | | | 25 | 25 | | | 80.5 | 83.1 |
| Experimental Example 4-11 | | | | | | | 30 | 27.5 | | | 80.4 | 82.9 |
| Experimental Example 4-12 | | | | | | | 35 | 30.5 | | | 80.2 | 82.8 |
| Experimental Example 4-13 | | | | | | | 35 | 41.5 | | | 80.1 | 80.5 |
| Experimental Example 4-14 | | | | | | | 35 | 50 | | | 80 | 80 |
| Experimental Example 4-15 | | | | | | | 35 | 55 | | | 80 | 80 |
| Experimental Example 4-16 | | | | | | | 40 | 33 | | | 78 | 75.6 |
| Experimental Example 4-17 | | | | | | | 45 | 36 | | | 75 | 74.5 |
| Experimental Example 4-18 | | | | | | | 50 | 38.5 | | | 74 | 73.9 |
| Experimental Example 4-19 | SiO$_x$ | 0.1 | 0.6 | 90 | SiO$_y$ | 1 | 1 | 3 | Inner Part < Outer Part | Multilayer | 75 | 78 |
| Experimental Example 4-20 | | | | | | | 20 | 22 | | | 74 | 74 |
| Experimental Example 4-21 | SiO$_x$ | 0.1 | 0.6 | 90 | SiO$_y$ | 1 | 1 | 3 | Inner Part ≥ Outer Part | Single-layer | 80.5 | 80.3 |
| Experimental Example 4-22 | | | | | | | 20 | 22 | | | 78 | 76 |

TABLE 4-continued

| Table 4 | Anode Active Material Particle | | | | | | | | | | Cycle | |
|---|---|---|---|---|---|---|---|---|---|---|---|---|
| | Core Section (Crystalline) | | | | Coating Section (Amorphous) | | | | | | | |
| | Kind | x | Half-width (°) | Crystallite Size (nm) | Kind | y | Average Area Proportion (%) | Average Particle Diameter (nm) | Magnitude Relation | Layer Configuration | Retention Ratio (%) | Initial Efficiency (%) |
| Experimental Example 4-23 | SiO$_x$ | 0.1 | 0.6 | 90 | SiO$_y$ | 0.8 | 10 | 18.5 | Inner Part ≥ Outer Part | Multilayer | 82.4 | 83 |
| Experimental Example 4-24 | | | | | | | 35 | 32 | | | 80 | 81 |
| Experimental Example 4-25 | | | | | | | 45 | 37 | | | 73 | 74 |

Even in the case where the physical properties of the coating section were changed, a high cycle retention ratio and high initial efficiency were obtained, and in particular, when the average area proportion was 35% or less and the average particle diameter was 55 μm or less, the cycle retention ratio and the initial efficiency were further increased. Moreover, when the magnitude relation in the average area proportion and the average particle diameter between the inner part and the outer part was the outer part≥the inner part, or when the coating section had a multilayer configuration, the cycle retention ratio and the initial efficiency were further increased.

Experimental Examples 5-1 to 5-4

For reference, secondary batteries were formed by the same steps as those in Experimental Example 1-3, except that as illustrated in Table 5, instead of the silicon-based material, a carbon material (graphite) was used as a forming material of the coating section, and various characteristics of the secondary batteries were determined. In this case, the carbon material (with a thickness of 100 nm) was deposited by a vacuum deposition method.

When the carbon material was used as the forming material of the coating section, the cycle retention ratio was much lower than that in the case where the silicon-based material was used. This result indicates that flexibility (protection function) of the silicon-based material allowed to follow swelling and shrinkage of the core section is not obtained by the carbon material.

Experimental Examples 6-1 to 6-9

Secondary batteries were formed by the same steps as those in Experimental Example 1-3, except that as illustrated in Table 6, the median diameter of the core section was changed, and various characteristics of the secondary batteries were determined. In this case, the median diameter of the core section was adjusted by using raw materials (silicon) with different median diameters.

TABLE 5

| Table 5 | Anode Active Material Particle | | | | | Cycle | |
|---|---|---|---|---|---|---|---|
| | Core Section (Crystalline) | | | | | | |
| | Kind | x | Half-width (°) | Crystallite Size (nm) | Coating Section | Retention Ratio (%) | Initial Efficiency (%) |
| Experimental Example 5-1 | SiO$_x$ | 0.1 | 0.6 | 90 | C | 48 | 83 |
| Experimental Example 5-2 | | 0.5 | | | | 47 | 81 |
| Experimental Example 5-3 | | 1 | | | | 46 | 75 |
| Experimental Example 5-4 | | 1.2 | | | | 45 | 68 |

TABLE 6

| Table 6 | Anode Active Material Particle | | | | | Cycle Retention Ratio (%) | Initial Efficiency (%) |
|---|---|---|---|---|---|---|---|
| | Core Section (Crystalline) | | | Coating Section (Amorphous) | | | |
| | Kind | x | Median Diameter (μm) | Kind | y | | |
| Experimental Example 6-1 | SiO$_x$ | 0.1 | 0.2 | SiO$_y$ | 1 | 74.1 | 78.6 |
| Experimental Example 6-2 | | | 0.5 | | | 82.6 | 80.3 |
| Experimental Example 6-3 | | | 1 | | | 83 | 81.6 |
| Experimental Example 1-3 | | | 4 | | | 83.5 | 82.6 |
| Experimental Example 6-4 | | | 7 | | | 82.4 | 82.5 |
| Experimental Example 6-5 | | | 10 | | | 82.3 | 82.3 |
| Experimental Example 6-6 | | | 15 | | | 82.1 | 81.6 |
| Experimental Example 6-7 | | | 20 | | | 80.9 | 81.4 |
| Experimental Example 6-8 | | | 25 | | | 71.3 | 79.6 |
| Experimental Example 6-9 | | | 30 | | | 69.5 | 71.5 |

When the median diameter of the core section was within a range of 0.5 μm to 20 μm both inclusive, the cycle retention ratio and the initial efficiency were further increased.

Experimental Examples 7-1 to 7-8

Secondary batteries were formed by the same steps as those in Experimental Example 1-3, except that as illustrated in Table 7, the average thickness of the coating section was changed, and various characteristics of the secondary batteries were determined. In this case, the average thickness of the coating section was adjusted by changing the deposition rate and the deposition time when forming the coating section.

TABLE 7

| Table 7 | Anode Active Material Particle | | | | | Cycle Retention Ratio (%) | Initial Efficiency (%) |
|---|---|---|---|---|---|---|---|
| | Core Section (Crystalline) | | Coating Section (Amorphous) | | | | |
| | Kind | x | Kind | y | Average Thickness | | |
| Experimental Example 7-1 | SiO$_x$ | 0.1 | SiO$_y$ | 1 | 0 | 34 | 85 |
| Experimental Example 7-2 | | | | | 1 | 74 | 84 |
| Experimental Example 7-3 | | | | | 10 | 76 | 83.5 |
| Experimental Example 7-4 | | | | | 100 | 81 | 83 |
| Experimental Example 1-3 | | | | | 500 | 83.5 | 82.6 |
| Experimental Example 7-5 | | | | | 1000 | 83.6 | 82.4 |
| Experimental Example 7-6 | | | | | 2000 | 83.7 | 82 |
| Experimental Example 7-7 | | | | | 5000 | 83.7 | 80.6 |
| Experimental Example 7-8 | | | | | 7000 | 83.7 | 74.1 |

When the coating section was formed, the cycle retention ratio was much higher than that in the case where the coating section was not formed, and in particular, when the average thickness was within a range of 1 nm to 5000 nm both inclusive, the cycle retention ratio was further increased.

Experimental Examples 8-1 to 8-9

Secondary batteries were formed by the same steps as those in Experimental Example 1-3, except that as illustrated in Table 8, the average coverage of the coating section was changed, and various characteristics of the secondary batteries were determined. In this case, the average coverage of the coating section was adjusted by changing input power and the deposition time when forming the coating section.

TABLE 8

| Table 8 | Anode Active Material Particle | | | | | Cycle Retention Ratio (%) | Initial Efficiency (%) |
|---|---|---|---|---|---|---|---|
| | Core Section (Crystalline) | | Coating Section (Amorphous) | | | | |
| | Kind | x | Kind | y | Average Coverage (%) | | |
| Experimental Example 8-1 | SiO$_x$ | 0.1 | SiO$_y$ | 1 | 10 | 76 | 86 |
| Experimental Example 8-2 | | | | | 20 | 77.5 | 85.1 |
| Experimental Example 8-3 | | | | | 30 | 80.1 | 84.8 |
| Experimental Example 8-4 | | | | | 40 | 81.3 | 84.2 |

TABLE 8-continued

| Table 8 | Anode Active Material Particle | | | | Cycle | |
|---|---|---|---|---|---|---|
| | Core Section (Crystalline) | | Coating Section (Amorphous) | | Retention Ratio (%) | Initial Efficiency (%) |
| | Kind | x | Kind | y | Average Coverage (%) | |
| Experimental Example 8-5 | | | | | 50 | 81.9 | 83.8 |
| Experimental Example 8-6 | | | | | 60 | 82.6 | 83.5 |
| Experimental Example 1-3 | | | | | 70 | 83.5 | 82.6 |
| Experimental Example 8-7 | | | | | 80 | 83.9 | 82.4 |
| Experimental Example 8-8 | | | | | 90 | 84.6 | 82.1 |
| Experimental Example 8-9 | | | | | 100 | 84.8 | 82 |

When the average coverage of the coating section was 10% or over, more specifically 30% or over, the cycle retention ratio and the initial efficiency were further increased.

Experimental Examples 9-1 to 9-8 and 10-1 to 10-9

Secondary batteries were formed by the same steps as those in Experimental Example 1-3, except that as illustrated in Tables 9 and 10, the core section included a metal material such as iron, and various characteristics of the secondary batteries were determined. In this case, when the core section was formed, the metal material was melted with the raw material of the silicon-based material.

When the core section included 0.01 wt % or over of iron, and the core section included any other metal material such as aluminum with iron, the cycle retention ratio and the initial efficiency were increased.

Experimental Examples 11-1 to 11-3

Secondary batteries were formed by the same steps as those in Experimental Example 1-3, except that as illustrated in Table 11, the anode current collector 54A included carbon and sulfur, and various characteristics of the secondary batteries were determined. In this case, as the anode current collector 54A, rolled copper foil including carbon and sulfur was used.

TABLE 9

| Table 9 | Anode Active Material Particle | | | | | Cycle Retention Ratio (%) | Initial Efficiency (%) |
|---|---|---|---|---|---|---|---|
| | Core Section (Crystalline) | | | Coating Section (Amorphous) | | | |
| | Kind | x | Metal Material (wt %) | Kind | y | | |
| Experimental Example 9-1 | $SiO_x$ | 0.1 | Fe(0.01) | $SiO_y$ | 1 | 83.7 | 82.7 |
| Experimental Example 9-2 | | | Fe(0.1) | | | 83.9 | 82.9 |
| Experimental Example 9-3 | | | Fe(0.2) | | | 84.1 | 83.1 |
| Experimental Example 9-4 | | | Fe(0.5) | | | 84.3 | 83.2 |
| Experimental Example 9-5 | | | Fe(1) | | | 84.5 | 83.2 |
| Experimental Example 9-6 | | | Fe(2) | | | 84.5 | 83.2 |
| Experimental Example 9-7 | | | Fe(5) | | | 84.5 | 83.2 |
| Experimental Example 9-8 | | | Fe(7.5) | | | 84.3 | 83.2 |

TABLE 10

| Table 10 | Anode Active Material Particle | | | | | Cycle Retention Ratio (%) | Initial Efficiency (%) |
|---|---|---|---|---|---|---|---|
| | Core Section (Crystalline) | | | Coating Section (Amorphous) | | | |
| | Kind | x | Metal Material (wt %) | Kind | y | | |
| Experimental Example 10-1 | $SiO_x$ | 0.1 | Fe(0.4) + Al(0.3) | $SiO_y$ | 1 | 84.5 | 84.3 |
| Experimental Example 10-2 | | | Fe(0.4) + Al(0.2) + Ca(0.1) | | | 84.4 | 84.2 |
| Experimental Example 10-3 | | | Fe(0.4) + Al(0.2) + Mn(0.1) | | | 84.6 | 84.6 |
| Experimental Example 10-4 | | | Fe(0.2) + Al(0.07) + Ca(0.02) | | | 84.6 | 84.4 |
| Experimental Example 10-5 | | | Fe(0.23) + Al(0.08) + Ca(0.02) | | | 84.5 | 84.2 |
| Experimental Example 10-6 | | | Fe(0.4) + Mn(0.3) | | | 84.7 | 84.2 |
| Experimental Example 10-7 | | | Fe(0.4) + Cr(0.3) | | | 84.3 | 84.1 |
| Experimental Example 10-8 | | | Fe(0.4) + Mg(0.3) | | | 84.1 | 84.6 |
| Experimental Example 10-9 | | | Fe(0.4) + Ni(0.3) | | | 84.2 | 84.4 |

TABLE 11

| Table 11 | Anode Active Material Particle | | | | Anode Current Collector C, S contents (ppm) | Cycle Retention Ratio (%) | Initial Efficiency (%) |
|---|---|---|---|---|---|---|---|
| | Core Section (Crystalline) | | Coating Section (Amorphous) | | | | |
| | Kind | x | Kind | y | | | |
| Experimental Example 11-1 | $SiO_x$ | 0.1 | $SiO_y$ | 1 | 50 | 83.6 | 83.5 |
| Experimental Example 11-2 | | | | | 100 | 83.3 | 83.5 |
| Experimental Example 11-3 | | | | | 200 | 81.5 | 83.4 |

When the anode current collector 54A included carbon and sulfur, the cycle retention ratio and the initial efficiency were increased, and in particular, when the contents of carbon and sulfur was 100 ppm or less, the cycle retention ratio and the initial efficiency were further increased.

Experimental Examples 12-1 to 12-4

Secondary batteries were formed by the same steps as those in Experimental Example 1-3, except that instead or rolled copper foil, electrolytic copper foil was used as the anode current collector 54A, and various characteristics of the secondary batteries were determined. In this case, electrolytic copper foil with a surface roughness (a ten-point average roughness Rz) illustrated in Table 12 was used.

TABLE 12

| Table 12 | Anode Active Material Particle | | | | Anode Current Collector Ten-point Average Roughness Rz (μm) | Cycle Retention Ratio (%) | Initial Efficiency (%) |
|---|---|---|---|---|---|---|---|
| | Core Section (Crystalline) | | Coating Section (Amorphous) | | | | |
| | Kind | x | Kind | y | | | |
| Experimental Example 12-1 | $SiO_x$ | 0.1 | $SiO_y$ | 1 | 0.5 | 82.8 | 83.5 |
| Experimental Example 12-2 | | | | | 1 | 83.1 | 83.4 |
| Experimental Example 12-3 | | | | | 3 | 83.3 | 83.5 |
| Experimental Example 12-4 | | | | | 5 | 83.6 | 83.5 |

Even in the case where the anode current collector 54A with a roughened surface was used, a high cycle retention ratio and high initial efficiency were obtained, and in particular, when the anode current collector 54A with a roughened surface was used, a substantially equal or higher cycle retention ratio was obtained and the initial efficiency was increased.

Experimental Examples 13-1 to 13-6

Secondary batteries were formed by the same steps as those in Experimental Example 1-3, except that as illustrated in Table 13, the anode active material layer 54B included a carbon material, and various characteristics of the secondary batteries were determined. In this case, an anode mixture was prepared, and then the carbon material (crystalline vein graphite) was added to the anode mixture.

TABLE 13

| Table 13 | Anode Active Material Particle | | | | Carbon Material Content (wt %) | Cycle Retention Ratio (%) | Initial Efficiency (%) |
|---|---|---|---|---|---|---|---|
| | Core Section (Crystalline) | | Coating Section (Amorphous) | | | | |
| | Kind | x | Kind | y | | | |
| Experimental Example 13-1 | $SiO_x$ | 0.1 | $SiO_y$ | 1 | 10 | 83.1 | 83.4 |
| Experimental Example 13-2 | | | | | 20 | 83.3 | 83.6 |
| Experimental Example 13-3 | | | | | 30 | 83.6 | 84 |
| Experimental Example 13-4 | | | | | 40 | 84 | 84.3 |
| Experimental Example 13-5 | | | | | 50 | 84.5 | 84.8 |
| Experimental Example 13-6 | | | | | 60 | 85 | 85.2 |

Even in the case where the anode active material layer 54B included the carbon material, a high cycle retention ratio and high initial efficiency were obtained, and in particular, when the carbon material was included, a substantially equal or higher cycle retention ratio was obtained, and the initial efficiency was further increased.

Experimental Examples 14-1 to 14-12

Secondary batteries were formed by the same steps as those in Experimental Example 1-3, except that as illustrated in Table 14, an additional coating film was formed on a surface of the coating section, and various characteristics of the secondary batteries were determined. In this case, the additional coating film was formed by the same steps as those in the case where the coating section was formed.

tion ratio was obtained and the initial efficiency was further increased. In this case, when the forming material of the additional coating film was carbon with lower electrical resistance than the anode active material particle (the core section and the coating section), the initial efficiency was further increased.

Experimental Examples 15-1 to 15-20

Secondary batteries were formed by the same steps as those in Experimental Example 1-3, except that as illustrated in Table 15, the kind of the anode binder was changed, and various characteristics of the secondary batteries were determined. In the case where a polyacrylic acid or lithium polyacrylate was used, a 17-vol % solution in which the poly-

TABLE 14

| Table 14 | Anode Active Material Particle | | | | Additional Coating Film | | Cycle | |
|---|---|---|---|---|---|---|---|---|
| | Core Section (Crystalline) | | Coating Section (Amorphous) | | | Average Thickness | Retention Ratio | Initial Efficiency |
| | Kind | x | Kind | y | Kind | (nm) | (%) | (%) |
| Experimental Example 14-1 | $SiO_x$ | 0.1 | $SiO_y$ | 1 | C | 100 | 83.5 | 85.3 |
| Experimental Example 14-2 | | | | | Co | | 83.2 | 85.6 |
| Experimental Example 14-3 | | | | | Fe | | 83.5 | 85.4 |
| Experimental Example 14-4 | | | | | Cu | | 83.5 | 85.6 |
| Experimental Example 14-5 | | | | | Al | | 83.9 | 85.7 |
| Experimental Example 14-6 | | | | | $SiO_2$ | | 83.4 | 82.8 |
| Experimental Example 14-7 | $SiO_x$ | 0.1 | $SiO_y$ | 1.3 | C | 100 | 83.3 | 84.3 |
| Experimental Example 14-8 | | | | | Co | | 83.6 | 84.3 |
| Experimental Example 14-9 | | | | | Fe | | 83.4 | 84.9 |
| Experimental Example 14-10 | | | | | Cu | | 83.5 | 84.1 |
| Experimental Example 14-11 | | | | | Al | | 83.1 | 84.9 |
| Experimental Example 14-12 | | | | | $SiO_2$ | | 83.5 | 82.4 |

Even in the case where the additional coating film was formed, a high cycle retention ratio and high initial efficiency were obtained, and in particular, when the additional coating film was formed, a substantially equal or higher cycle retenacrylic acid or lithium polyacrylate was dissolved was used to prepare anode mixture slurry, and the anode mixture slurry was hot-pressed to form the anode active material layer 54B without firing.

TABLE 15

| Table 15 | Anode Active Material Particle | | | | | Cycle | |
|---|---|---|---|---|---|---|---|
| | Core Section (Crystalline) | | Coating Section (Amorphous) | | | Retention Ratio | Initial Efficiency |
| | Kind | x | Kind | y | Anode Binder | (%) | (%) |
| Experimental Example 15-1 | $SiO_x$ | 0.1 | $SiO_y$ | 1 | Polyamide | 82.3 | 83 |
| Experimental Example 15-2 | | 0.1 | | 0.4 | | 60 | 81.1 |
| Experimental Example 15-3 | | 0.3 | | 1 | | 82.5 | 82.1 |
| Experimental Example 15-4 | | 1 | | 0.7 | | 81 | 57 |
| Experimental Example 15-5 | $SiO_x$ | 0.1 | $SiO_y$ | 1 | Polyamideimide | 81.6 | 82.1 |
| Experimental Example 15-6 | | 0.1 | | 0.4 | | 60 | 81 |
| Experimental Example 15-7 | | 0.3 | | 1 | | 81.6 | 81.5 |

TABLE 15-continued

| Table 15 | Anode Active Material Particle | | | | | Cycle Retention Ratio (%) | Initial Efficiency (%) |
|---|---|---|---|---|---|---|---|
| | Core Section (Crystalline) | | Coating Section (Amorphous) | | | | |
| | Kind | x | Kind | y | Anode Binder | | |
| Experimental Example 15-8 | | 1 | | 0.7 | | 81 | 57 |
| Experimental Example 15-9 | $SiO_x$ | 0.1 | $SiO_y$ | 1 | PVDF | 82.4 | 83.2 |
| Experimental Example 15-10 | | 0.1 | | 0.4 | | 59 | 81 |
| Experimental Example 15-11 | | 0.3 | | 1 | | 82.9 | 82.6 |
| Experimental Example 15-12 | | 1 | | 0.7 | | 82 | 56 |
| Experimental Example 15-13 | $SiO_x$ | 0.1 | $SiO_y$ | 1 | Polyacrylic | 81.6 | 82 |
| Experimental Example 15-14 | | 0.1 | | 0.4 | Acid | 57 | 81.1 |
| Experimental Example 15-15 | | 0.3 | | 1 | | 81.6 | 81 |
| Experimental Example 15-16 | | 1 | | 0.7 | | 81 | 54 |
| Experimental Example 15-17 | $SiO_x$ | 0.1 | $SiO_y$ | 1 | Lithium | 81.7 | 82.3 |
| Experimental Example 15-18 | | 0.1 | | 0.4 | Polyacrylate | 58 | 81.9 |
| Experimental Example 15-19 | | 0.3 | | 1 | | 81.9 | 81.4 |
| Experimental Example 15-20 | | 1 | | 0.7 | | 82 | 55 |

Even in the case where the kind of the anode binder was changed, a high cycle retention ratio and high initial efficiency were obtained.

Experimental Examples 16-1 to 16-12

Secondary batteries were formed by the same steps as those in Experimental Example 1-3, except that as illustrated in Table 16, the kind of the cathode active material was changed, and various characteristics of the secondary batteries were determined

TABLE 16

| Table 16 | Cathode Active Material | Cycle Retention Ratio (%) | Initial Efficiency (%) |
|---|---|---|---|
| Experimental Example 16-1 | $LiNi_{0.7}Co_{0.25}Al_{0.05}O_2$ | 84.1 | 82.6 |
| Experimental Example 16-2 | $LiNi_{0.79}Co_{0.14}Al_{0.07}O_2$ | 84.2 | 82.5 |
| Experimental Example 16-3 | $LiNi_{0.7}Co_{0.25}Mg_{0.05}O_2$ | 84.1 | 82.4 |
| Experimental Example 16-4 | $LiNi_{0.7}Co_{0.25}Fe_{0.05}O_2$ | 84.2 | 82.5 |
| Experimental Example 16-5 | $LiNiO_2$ | 83.7 | 82.6 |
| Experimental Example 16-6 | $LiNi_{0.33}Co_{0.33}Mn_{0.33}O_2$ | 84.1 | 82.5 |
| Experimental Example 16-7 | $LiNi_{0.13}Co_{0.6}Mn_{0.27}O_2$ | 84.3 | 82.6 |
| Experimental Example 16-8 | $Li_{1.13}[Mn_{0.6}Co_{0.18}Ni_{0.22}]_{0.87}O_2$ | 84.1 | 82.4 |
| Experimental Example 16-9 | $Li_{1.13}[Mn_{0.6}Co_{0.2}Ni_{0.2}]_{0.87}O_2$ | 84.2 | 82.5 |
| Experimental Example 16-10 | $Li_{1.13}[Mn_{0.6}Co_{0.22}Ni_{0.18}]_{0.87}O_2$ | 84.2 | 82.4 |
| Experimental Example 16-11 | $Li_{1.13}[Mn_{0.5}CO_{0.25}Ni_{0.25}]_{0.87}O_2$ | 84.1 | 82.4 |
| Experimental Example 16-12 | $Li_2Cu_{0.6}Ni_{0.4}O_2$ | 84.3 | 82.3 |

Even in the case where the kind of the cathode active material was changed, a high cycle retention ratio and high initial efficiency were obtained.

Experimental Examples 17-1 to 17-9

Secondary batteries were formed by the same steps as those in Experimental Example 1-3, except that as illustrated in Table 17, the composition of the electrolytic solution was changed, and various characteristics of the secondary batteries were determined. As the composition (weight ratio) of the solvent, the ratio of 4-fluoro-1,3-dioxolane-2-one (FEC) and DEC was 50:50, the ratio of EC:DEC:4,5-difluoro-1,3-dioxolane-2-one (DFEC) was 25:70:5. The content of vinylene carbonate (VC), vinyl ethylene carbonate (VEC), propane sultone (PRS), sulfobenzoic anhydride (SBAH) or sulfopropionic anhydride (SPAH) in the solvent was 1 wt %. As the content of the electrolytic salt relative to the solvent, the content of $LiPF_6$ was 0.9 mol/kg and the content of $LiBF_4$ was 0.1 mol/kg.

TABLE 17

| Table 17 | Solvent | Electrolyte Salt | Cycle Retention Ratio (%) | Initial Efficiency (%) |
|---|---|---|---|---|
| Experimental Example 17-1 | FEC + DEC | LiPF$_6$ | 84.5 | 82.6 |
| Experimental Example 17-2 | EC + DEC + DFEC | | 84.3 | 82.5 |
| Experimental Example 17-3 | EC + DMC + DFEC | | 85 | 82.3 |
| Experimental Example 17-4 | FEC + DEC    VC | | 84.6 | 82.6 |
| Experimental Example 17-5 | VEC | | 84.5 | 82.4 |
| Experimental Example 17-6 | PRS | | 84.6 | 82.5 |
| Experimental Example 17-7 | SBAH | | 84.5 | 82.6 |
| Experimental Example 17-8 | SPAH | | 84.6 | 82.5 |
| Experimental Example 17-9 | FEC + DEC | LiPF$_6$ + LiBF$_4$ | 84.7 | 82.6 |

A high cycle retention ratio was obtained independent of the composition of the electrolytic solution, and in particular, when another solvent (such as halogenated cyclic carbonate) or another electrolyte salt (LiBF$_4$) was used, the cycle retention ratio was further increased, and substantially equal or higher initial efficiency was obtained.

Experimental Examples 18-1 and 18-2

Secondary batteries were formed by the same steps as those in the Experimental Example 1-3, except that as illustrated in Table 18, the battery configuration was changed, and various characteristics of the secondary batteries were determined. In the case where a prismatic type secondary battery was formed, a battery can made of aluminum or iron was used.

TABLE 18

| Table 18 | Battery Configuration | Cycle Retention Ratio (%) | Initial Efficiency (%) |
|---|---|---|---|
| Experimental Example 18-1 | Prismatic type (Al) | 84.6 | 82.7 |
| Experimental Example 18-2 | Prismatic type (Fe) | 85.5 | 82.7 |

A high cycle retention ratio was obtained independent of the battery configuration, and in particular, in the prismatic type secondary battery, the cycle retention ratio and the initial efficiency were increased, and when the battery can was made of iron, the cycle retention ratio was further increased.

Experimental Examples 19-1 to 19-64

Secondary batteries were formed by the same steps as those in Experimental Example 1-3, except that as illustrated in Tables 19 to 23, the core section included a metal material such as aluminum, or the like, and various characteristics of the secondary batteries were determined. In this case, when the core section was formed, the metal material or the like was melted with the raw material of the silicon-based material. Note that the composition (at %) of the core section illustrated in Tables 19 to 23 indicates an atomic ratio of atoms of all elements except for oxygen.

In this case, in addition to cycle characteristics (the cycle retention ratio) and initial charge-discharge characteristics (initial efficiency), load characteristics were determined. To determine the load characteristics, first, one cycle of charge and discharge was performed on each of the secondary batteries in an atmosphere of 23° C. to stabilize its battery state. Next, each of the secondary batteries was charged again at a current of 0.2 C to determine the charge capacity, and then each of the secondary batteries was discharged at a current of 1 C to determine the discharge capacity. Finally, a load retention ratio (%)=(discharge capacity at 1 C/charge capacity at 0.2 C)×100 was determined by calculation. Note that 0.2 C and 1 C represent current values at which the theoretical capacity of a battery is fully discharged for 5 hours and 1 hour, respectively. Other conditions of charge and discharge were the same as those in the case where the cycle characteristics were determined.

TABLE 19

| | Anode Active Material Particle | | | | | | | Cycle | Initial | Load |
|---|---|---|---|---|---|---|---|---|---|---|
| | Core Section (Crystalline) | | | | | Coating Section (Amorphous) | | Retention | Effi- | Retention |
| | | | Composition | Half-width | Crystallite Size | | | Ratio | ciency | Ratio |
| Table 19 | Kind | x | (at %) | (°) | (nm) | Kind | y | (%) | (%) | (%) |
| Experimental Example 19-1 | SiO$_x$ | 0.1 | Si(99.9) + Al(0.1) | 0.6 | 90 | SiO$_y$ | 1 | 83.9 | 83.1 | 88.1 |
| Experimental Example 19-2 | | | Si(95) + Al(5) | 0.8 | 70 | | | 84.1 | 82.3 | 88.9 |
| Experimental Example 19-3 | | | Si(80) + Al(20) | 1.2 | 50 | | | 86.2 | 81.7 | 90.6 |
| Experimental Example 19-4 | | | Si(50) + Al(50) | 2.5 | 20 | | | 88.5 | 80.3 | 91.6 |
| Experimental Example 19-5 | | | Si(40) + Al(60) | 3 | 20 | | | 87.9 | 78.4 | 91.5 |
| Experimental Example 19-6 | SiO$_x$ | 0.1 | Si(50) + Al(49) + Cr(1) | 2.6 | 20 | SiO$_y$ | 1 | 88.6 | 80.5 | 91.8 |
| Experimental Example 19-7 | | | Si(50) + Al(49) + Ni(1) | 2.6 | 20 | | | 88.6 | 80.5 | 91.7 |
| Experimental Example 19-8 | | | Si(50) + Al(49) + Fe(1) | 2.6 | 20 | | | 88.7 | 80.4 | 91.9 |
| Experimental Example 19-9 | | | Si(40) + Al(41) + Cr(19) | 2.7 | 20 | | | 88.9 | 80.6 | 92.1 |
| Experimental Example 19-10 | | | Si(40) + Al(41) + Ni(19) | 2.8 | 20 | | | 88.8 | 80.7 | 92.2 |
| Experimental Example 19-11 | | | Si(40) + Al(41) + Fe(19) | 2.8 | 20 | | | 88.7 | 80.6 | 92.3 |
| Experimental Example 19-12 | | | Si(35) + Al(46) + Cr(19) | 3 | 20 | | | 89.2 | 80.4 | 92.5 |
| Experimental Example 19-13 | | | Si(35) + Al(46) + Ni(19) | 2.9 | 20 | | | 89.2 | 80.3 | 92.4 |
| Experimental Example 19-14 | | | Si(35) + Al(46) + Fe(19) | 2.9 | 20 | | | 89.3 | 80.3 | 92.4 |

TABLE 20

| Table 20 | Anode Active Material Particle | | | | | | Cycle Retention Ratio (%) | Initial Efficiency (%) | Load Retention Ratio (%) |
|---|---|---|---|---|---|---|---|---|---|
| | Core Section (Crystalline) | | | | | Coating Section (Amorphous) | | | |
| | Kind | x | Composition (at %) | Half-width (°) | Crystallite Size (nm) | Kind | y | | | |
| Experimental Example 19-15 | SiO$_x$ | 0.1 | Si(30) + Al(20) + Cr(50) | 2.5 | 20 | SiO$_y$ | 1 | 89.5 | 80.3 | 92.6 |
| Experimental Example 19-16 | | | Si(30) + Al(20) + Ni(50) | 2.5 | 20 | | | 89.3 | 80.1 | 92.6 |
| Experimental Example 19-17 | | | Si(30) + Al(20) + Fe(50) | 2.5 | 20 | | | 89.5 | 80.6 | 92.6 |
| Experimental Example 19-18 | | | Si(30) + Al(10) + Cr(60) | 2.4 | 20 | | | 85.1 | 77.8 | 92.4 |
| Experimental Example 19-19 | | | Si(30) + Al(10) + Ni(60) | 2.4 | 20 | | | 84.7 | 78.1 | 92.4 |
| Experimental Example 19-20 | | | Si(30) + Al(10) + Fe(60) | 2.4 | 20 | | | 85.1 | 77.9 | 92.6 |
| Experimental Example 19-21 | SiO$_x$ | 0.1 | Si(30) + Al(47.5) + Cr(22.49) + Cu(0.01) | 2.8 | 20 | SiO$_y$ | 1 | 89.5 | 80 | 92.4 |
| Experimental Example 19-22 | | | Si(30) + Al(47.5) + Ni(22.49) + Cu(0.01) | 2.9 | 20 | | | 89.7 | 80.1 | 92.6 |
| Experimental Example 19-23 | | | Si(30) + Al(47.5) + Fe(22.49) + Cu(0.01) | 2.9 | 20 | | | 89.4 | 80.1 | 92.5 |
| Experimental Example 19-24 | | | Si(30) + Al(47.5) + Cr(12.5) + Cu(10) | 3 | 20 | | | 90 | 80.5 | 92.5 |
| Experimental Example 19-25 | | | Si(30) + Al(47.5) + Ni(12.5) + Cu(10) | 3 | 20 | | | 90.1 | 80.2 | 92.5 |
| Experimental Example 19-26 | | | Si(30) + Al(47.5) + Fe(12.5) + Cu(10) | 3 | 20 | | | 90.2 | 80.6 | 92.6 |
| Experimental Example 19-27 | | | Si(30) + Al(25) + Cr(25) + Cu(20) | 2.7 | 20 | | | 90.2 | 80.3 | 92.6 |
| Experimental Example 19-28 | | | Si(30) + Al(25) + Ni(25) + Cu(20) | 2.6 | 20 | | | 90.1 | 80.2 | 92.4 |
| Experimental Example 19-29 | | | Si(30) + Al(25) + Fe(25) + Cu(20) | 2.6 | 20 | | | 90.5 | 80.4 | 92.4 |

TABLE 21

| Table 21 | Anode Active Material Particle | | | | | | Cycle Retention Ratio (%) | Initial Efficiency (%) | Load Retention Ratio (%) |
|---|---|---|---|---|---|---|---|---|---|
| | Core Section (Crystalline) | | | | | Coating Section (Amorphous) | | | |
| | Kind | x | Composition (at %) | Half-width (°) | Crystallite Size (nm) | Kind | y | | | |
| Experimental Example 19-30 | SiO$_x$ | 0.1 | Si(30) + Al(20) + Cr(30) + Cu(20) | 2.6 | 20 | SiO$_y$ | 1 | 90.3 | 80.4 | 92.5 |
| Experimental Example 19-31 | | | Si(30) + Al(20) + Ni(30) + Cu(20) | 2.7 | 20 | | | 90.4 | 80.2 | 92.4 |
| Experimental Example 19-32 | | | Si(30) + Al(20) + Fe(30) + Cu(20) | 2.6 | 20 | | | 90.3 | 80.1 | 92.6 |
| Experimental Example 19-33 | | | Si(30) + Al(27.5) + Cr(12.5) + Cu(30) | 2.6 | 20 | | | 90.1 | 80.6 | 92.6 |
| Experimental Example 19-34 | | | Si(30) + Al(27.5) + Ni(12.5) + Cu(30) | 2.6 | 20 | | | 89.9 | 80.5 | 92.6 |
| Experimental Example 19-35 | | | Si(30) + Al(27.5) + Fe(12.5) + Cu(30) | 2.6 | 20 | | | 89.9 | 80.5 | 92.1 |
| Experimental Example 19-36 | | | Si(30) + Al(20) + Cr(12.5) + Cu(37.5) | 2.5 | 20 | | | 88.9 | 76.7 | 92.1 |
| Experimental Example 19-37 | | | Si(30) + Al(20) + Ni(12.5) + Cu(37.5) | 2.5 | 20 | | | 89 | 77 | 92.5 |
| Experimental Example 19-38 | | | Si(30) + Al(20) + Fe(12.5) + Cu(37.5) | 2.5 | 20 | | | 88.9 | 76.9 | 92.4 |
| Experimental Example 19-39 | SiO$_x$ | 0.1 | Si(30) + Al(47.5) + Cr(12.5) + B(10) | 2.9 | 20 | SiO$_y$ | 1 | 90.1 | 80.4 | 92 |
| Experimental Example 19-40 | | | Si(30) + Al(47.5) + Ni(12.5) + Mg(10) | 2.9 | 20 | | | 89.9 | 80.3 | 91.9 |
| Experimental Example 19-41 | | | Si(30) + Al(47.5) + Fe(12.5) + Ca(10) | 2.9 | 20 | | | 89.8 | 80.4 | 92 |
| Experimental Example 19-42 | | | Si(30) + Al(47.5) + Cr(12.5) + Ti(10) | 2.9 | 20 | | | 90.2 | 80.2 | 92 |
| Experimental Example 19-43 | | | Si(30) + Al(47.5) + Ni(12.5) + V(10) | 2.9 | 20 | | | 90.2 | 80.2 | 92 |
| Experimental Example 19-44 | | | Si(30) + Al(47.5) + Fe(12.5) + Mn(10) | 2.9 | 20 | | | 90.2 | 80.3 | 91.9 |

TABLE 22

| Table 22 | Anode Active Material Particle | | | | | | Cycle Retention Ratio (%) | Initial Efficiency (%) | Load Retention Ratio (%) |
|---|---|---|---|---|---|---|---|---|---|
| | Core Section (Crystalline) | | | | | Coating Section (Amorphous) | | | |
| | Kind | x | Composition (at %) | Half-width (°) | Crystallite Size (nm) | Kind | y | | | |
| Experimental Example 19-45 | SiO$_x$ | 0.1 | Si(30) + Al(47.5) + Fe(12.5) + Co(10) | 3 | 20 | SiO$_y$ | 1 | 90.1 | 80.3 | 91.9 |
| Experimental Example 19-46 | | | Si(30) + Al(47.5) + Fe(12.5) + Ge(10) | 3 | 20 | | | 89.9 | 80.4 | 92.1 |
| Experimental Example 19-47 | | | Si(30) + Al(47.5) + Fe(12.5) + Y(10) | 3 | 20 | | | 90 | 80.1 | 92.2 |
| Experimental Example 19-48 | | | Si(30) + Al(47.5) + Fe(12.5) + Zr(10) | 3 | 20 | | | 90 | 80.2 | 92.1 |
| Experimental Example 19-49 | | | Si(30) + Al(47.5) + Fe(12.5) + Mo(10) | 2.9 | 20 | | | 90.1 | 80.1 | 92.2 |
| Experimental Example 19-50 | | | Si(30) + Al(47.5) + Fe(12.5) + Ag(10) | 2.9 | 20 | | | 90 | 80.3 | 92.1 |
| Experimental Example 19-51 | | | Si(30) + Al(47.5) + Fe(12.5) + In(10) | 3 | 20 | | | 90.2 | 80.2 | 92.3 |
| Experimental Example 19-52 | | | Si(30) + Al(47.5) + Fe(12.5) + Sn(10) | 2.9 | 20 | | | 90.2 | 80.2 | 92.3 |
| Experimental Example 19-53 | | | Si(30) + Al(47.5) + Fe(12.5) + Sb(10) | 2.9 | 20 | | | 90 | 80.2 | 92.4 |
| Experimental Example 19-54 | | | Si(30) + Al(47.5) + Fe(12.5) + Ta(10) | 3 | 20 | | | 90.1 | 80.2 | 92.3 |
| Experimental Example 19-55 | | | Si(30) + Al(47.5) + Fe(12.5) + W(10) | 2.9 | 20 | | | 90.1 | 80.3 | 92.4 |
| Experimental Example 19-56 | | | Si(30) + Al(47.5) + Fe(12.5) + Pb(10) | 3 | 20 | | | 90.3 | 80.3 | 92.2 |
| Experimental Example 19-57 | | | Si(30) + Al(47.5) + Fe(12.5) + La(10) | 2.9 | 20 | | | 90.3 | 80.3 | 92.2 |
| Experimental Example 19-58 | | | Si(30) + Al(47.5) + Fe(12.5) + Ce(10) | 3 | 20 | | | 90.3 | 80.1 | 92.3 |
| Experimental Example 19-59 | | | Si(30) + Al(47.5) + Fe(12.5) + Pr(10) | 2.9 | 20 | | | 90.2 | 80.2 | 92.4 |

TABLE 23

| Table 23 | Anode Active Material Particle | | | | | | Cycle Retention Ratio (%) | Initial Efficiency (%) | Load Retention Ratio (%) |
|---|---|---|---|---|---|---|---|---|---|
| | Core Section (Crystalline) | | | | | Coating Section (Amorphous) | | | |
| | Kind | x | Composition (at %) | Half-width (°) | Crystallite Size (nm) | Kind | y | | | |
| Experimental Example 19-60 | SiO$_x$ | 0.1 | Si(30) + Al(47.5) + Fe(12.5) + Nd(10) | 3 | 20 | SiO$_y$ | 1 | 90.2 | 80.3 | 92.5 |
| Experimental Example 19-61 | | | Si(10) + Al(47.5) + Cr(12.5) + Cu(30) | 3.5 | 20 | | | 90.3 | 69.3 | 91.9 |
| Experimental Example 19-62 | | | Si(20) + Al(47.5) + Cr(7.5) + Cu(25) | 3 | 20 | | | 90.4 | 80 | 92.1 |
| Experimental Example 19-63 | | | Si(80) + Al(10) + Cr(5) + Cu(5) | 1.5 | 20 | | | 86.5 | 82.2 | 90.9 |
| Experimental Example 19-64 | | | Si(85) + Al(5) + Cr(5) + Cu(5) | 1.1 | 20 | | | 84 | 82.4 | 88.5 |

When the core section included 0.1 at % to 50 at % of aluminum, the cycle retention ratio was increased while substantially maintaining the initial efficiency, and a high load retention ratio was obtained. The half-width and the crystallite size of the core section in this case was 0.6° or over and 90 nm or less, respectively.

In this case, when the core section further included 1 at % to 50 at % of chromium or the like, the cycle retention ratio was increased while substantially maintaining the initial efficiency and the load retention ratio. Moreover, when the core section further included 0.01 at % to 30 at % of boron or the like, the cycle retention ratio was increased.

In the case where the core section included aluminum or the like, when the silicon content was within a range of 20 at % to 80 at % both inclusive, the cycle retention ratio, the initial efficiency and the load retention ratio were increased.

Experimental Examples 20-1 to 20-9

Secondary batteries were formed by the same steps as those in Experimental Examples 1-2 and 19-24, except that as illustrated in Table 24, the anode utilization ratio was changed by adjusting the thicknesses of the cathode active material layer 53B and the anode active material layer 54B, and various characteristics of the secondary batteries were determined.

bonding states) were present, the second battery did not function as a battery; therefore, the cycle retention ratio and the initial efficiency were not determined.

TABLE 24

| Table 24 | Anode Active Material Particle | | | | | | Anode Utilization Ratio (%) | Cycle Retention Ratio (%) | Initial Efficiency (%) | Load Retention Ratio (%) |
|---|---|---|---|---|---|---|---|---|---|---|
| | Core Section (Crystalline) | | | Coating Section (Amorphous) | | | | | | |
| | Kind | x | Composition (at %) | | Kind | y | | | | |
| Experimental Example 20-1 | $SiO_x$ | 0.05 | — | | $SiO_y$ | 1 | 35 | 84.7 | 81.7 | 85.4 |
| Experimental Example 20-2 | | | | | | | 50 | 85.3 | 83.2 | 85.3 |
| Experimental Example 1-2 | | | | | | | 65 | 83.5 | 83.8 | 85.1 |
| Experimental Example 20-3 | | | | | | | 80 | 79 | 84.2 | 84.9 |
| Experimental Example 20-4 | | | | | | | 95 | 70.2 | 85 | 84.4 |
| Experimental Example 20-5 | $SiO_x$ | 0.05 | Si(30) + Al(47.5) + Cr(12.5) + Cu(10) | | $SiO_y$ | 1 | 35 | 87.4 | 77.9 | 92.3 |
| Experimental Example 20-6 | | | | | | | 50 | 87.3 | 81 | 92.4 |
| Experimental Example 20-7 | | | | | | | 65 | 87.2 | 81.3 | 92.3 |
| Experimental Example 20-8 | | | | | | | 80 | 87.1 | 81.8 | 92.2 |
| Experimental Example 20-9 | | | | | | | 95 | 84.5 | 83 | 92 |

When the anode unitization ratio was within a range of 35% to 80% both inclusive, the cycle retention ratio, the initial efficiency and the load retention ratio were increased.

Experimental Examples 21-1 to 21-10

Secondary batteries were formed by the same steps as those in Experimental Example 1-3, except that as illustrated in Table 25, the abundance ratio (atomic ratio) of bonding states of silicon atoms to oxygen atoms in the coating section was changed by adjusting the introduction amount of a gas (oxygen and hydrogen) introduced into a chamber and adjusting the temperature of the core section, and various characteristics of the secondary batteries were determined.

The following result is derived from the results in Tables 1 to 25. In the invention, the anode active material particles each include the core section including the silicon-based material ($SiO_x$: $0 \leq x < 0.5$) and the coating section including the low-crystalline or amorphous silicon-based material ($SiO_y$: $0.5 \leq y \leq 1.8$). Therefore, the cycle characteristics and the initial charge-discharge characteristics are improved independent of the median diameter of the core section, the average thickness of the coating section, or the like.

Although the present invention is described referring to the embodiment and the examples, the invention is not limited thereto, and may be variously modified. For example, the case where the capacity of the anode is represented on the basis of insertion and extraction of lithium ions is described, but the

TABLE 25

| Table 25 | Anode Active Material Particle | | | | | | | | | Cycle Retention Ratio (%) | Initial Efficiency (%) |
|---|---|---|---|---|---|---|---|---|---|---|---|
| | Core Section (Crystalline) | | Coating Section (Amorphous) | | | | | | | | |
| | | | | | Abundance Ratio (at %) | | | | | | |
| | Kind | x | Kind | y | $Si^{0+}$ | $Si^{1+}$ | $Si^{2+}$ | $Si^{3+}$ | $Si^{4+}$ | | |
| Experimental Example 21-1 | $SiO_x$ | 0.1 | $SiO_y$ | 1 | 9 | 4.91 | 13.35 | 37.14 | 35.61 | 83 | 81 |
| Experimental Example 1-3 | | | | | 14.73 | 8.84 | 15.75 | 25.04 | 35.64 | 83.5 | 82.6 |
| Experimental Example 21-2 | | | | | 14.96 | 7.38 | 14.46 | 31.32 | 31.88 | 84 | 84 |
| Experimental Example 21-3 | | | | | 84.16 | 7.87 | 4.88 | 0.86 | 2.23 | 73 | 84 |
| Experimental Example 21-4 | | | | | 92.67 | 3.47 | 3.2 | 0.29 | 0.36 | 70 | 85 |
| Experimental Example 21-5 | | | | | 8.61 | 10.22 | 21.97 | 18.1 | 41.1 | 79 | 78 |
| Experimental Example 21-6 | | | | | 15.05 | 10.77 | 20.81 | 21.81 | 31.57 | 74 | 76 |
| Experimental Example 21-7 | | | | | 27.93 | 10.3 | 16.67 | 22.34 | 22.75 | 71 | 72 |
| Experimental Example 21-8 | | | | | 15.45 | 6.9 | 15.38 | 35.05 | 27.22 | 73 | 83 |
| Experimental Example 21-9 | | | | | 0 | 0 | 0 | 5 | 95 | — | — |
| Experimental Example 21-10 | | | | | 95 | 5 | 0 | 0 | 0 | 55 | 85 |

When 5 kinds of bonding states (zero-valence to tetravalence) were present, compared to the case where some of bonding states were present, the cycle retention ratio was much higher. In this case, the abundance ratio satisfied a relationship of $Si^{0+} \leq Si^{1+}+Si^{2+}+Si^{3+}+Si^{4+}$ or relationships of $Si^{1+} \leq Si^{3+}$, $Si^{2+} \leq Si^{3+}$, $Si^{1+} \leq Si^{4+}$ and $Si^{2+} \leq Si^{4+}$, a high cycle retention ratio was obtained. These good results were mostly obtained in the case where the abundance ratio of the tetravalent ($Si^{4+}$) bonding state was 20 at % or over, more specifically 30 at % or over. In the case where only the bonding states with a large valence number (the trivalent and tetravalent invention is not limited thereto. The invention is also applicable to the case where the capacity of an anode includes a capacity on the basis of insertion and extraction of lithium ions and a capacity on the basis of deposition and dissolution of lithium metal, and is represented by the sum of them. In this case, as the anode active material, an anode material allowed to insert and extract lithium ions is used, and a chargeable capacity of the anode material is set to be smaller than the discharge capacity of a cathode.

Moreover, the case where the battery configuration is a prismatic type, a cylindrical type or a laminate film type, and the battery element has a spirally wound configuration is described, but the invention is not limited thereto. The invention is also applicable to the case where the battery configuration is a button type or the like, or the case where the battery element has a laminate configuration or the like.

The present application contains subject matter related to that disclosed in Japanese Priority Patent Application JP 2009-292430 filed in the Japan Patent Office on Dec. 24, 2009, Japanese Priority Patent Application JP 2010-087659 filed in the Japan Patent Office on Apr. 6, 2010 and Japanese Priority Patent Application JP 2010-242174 filed in the Japan Patent Office on Oct. 28, 2010, the entire content of which is hereby incorporated by references.

It should be understood by those skilled in the art that various modifications, combinations, sub-combinations and alterations may occur depending on design requirements and other factors insofar as they are within the scope of the appended claims or the equivalents thereof.

What is claimed is:

1. A lithium-ion secondary battery comprising:
a cathode;
an anode; and
an electrolytic solution,
wherein,
the anode includes an anode active material layer including a plurality of anode active material particles,
each anode active material particle includes a core section and a coating section applied to a part or all of a surface of the core section, and
the core section includes a silicon-based material $SiO_x$, where $0 \leq x < 0.5$, and the coating section includes an amorphous or low-crystalline silicon-based material $SiO_y$, where $0.5 \leq y \leq 0.9$.

2. The lithium-ion secondary battery according to claim 1, wherein
in the silicon-based material included in the coating section, the amorphous silicon-based material includes only an amorphous region and the low-crystalline silicon-based material includes an amorphous region and crystal grains.

3. The lithium-ion secondary battery according to claim 2, wherein
in the low-crystalline silicon-based material included in the coating section, an average area proportion of the crystal grains corresponding to (111) plane and (220) plane of silicon (Si) is 35% or less.

4. The lithium-ion secondary battery according to claim 2, wherein
in the low-crystalline silicon-based material included in the coating section, an average particle diameter of the crystal grains corresponding to (111) plane and (220) plane of silicon is 55 nm or less.

5. The lithium-ion secondary battery according to claim 2, wherein
in the low-crystalline silicon-based material included in the coating section, in the crystal grains corresponding to (111) plane and (220) plane of silicon, when the coating section is divided into two equal parts in a thickness direction, an average area proportion and an average particle diameter of the crystal grains in an inner part are equal to or larger than those in an outer part.

6. The lithium-ion secondary battery according to claim 2, wherein
in the low-crystalline silicon-based material included in the coating section, the crystal grains are dotted in the amorphous region.

7. The lithium-ion secondary battery according to claim 1, wherein
the coating section is configured of a plurality of layers.

8. The lithium-ion secondary battery according to claim 1, wherein
in the core section, a half-width ($2\theta$) of a diffraction peak corresponding to (111) crystal plane of silicon obtained by X-ray diffraction is 20° or less, and a crystallite size corresponding to the (111) crystal plane is 10 nm or over.

9. The lithium-ion secondary battery according to claim 1, wherein
a median diameter of the core section is within a range of 0.5 μm to 20 μm both inclusive.

10. The lithium-ion secondary battery according to claim 1, wherein
an average thickness of the coating section is within a range of 1 nm to 5000 nm both inclusive.

11. The lithium-ion secondary battery according to claim 1, wherein
an average coverage of the coating section is 30% or over.

12. The lithium-ion secondary battery according to claim 1, wherein
the core section includes a simple substance of silicon.

13. The lithium-ion secondary battery according to claim 1, wherein
the core section includes iron (Fe) and the iron content is 0.01 wt % or over.

14. The lithium-ion secondary battery according to claim 1, wherein
the anode includes the anode active material layer on an anode current collector, and the anode current collector includes carbon (C) and sulfur (S), and the contents of carbon and sulfur are 100 ppm or less.

15. The lithium-ion secondary battery according to claim 1, wherein
the anode active material layer includes a carbon material.

16. The lithium-ion secondary battery according to claim 1, wherein
the core section includes aluminum (Al) and the aluminum content, expressed as an atomic ratio excluding oxygen (O), is within a range of 0.1 at % to 50 at % both inclusive.

17. The lithium-ion secondary battery according to claim 16, wherein
the core section includes one or more kinds of materials selected from the group consisting of chromium (Cr), iron (Fe), and nickel (Ni), and the content thereof, expressed as an atomic ratio excluding oxygen (O), is within a range of 1 at % to 50 at % both inclusive.

18. The lithium-ion secondary battery according to claim 17, wherein
the core section includes one or more kinds of materials selected from the group consisting of boron (B), magnesium (Mg), calcium (Ca), titanium (Ti), vanadium (V), manganese (Mn), cobalt (Co), copper (Cu), germanium (Ge), yttrium (Y), zirconium (Zr), molybdenum (Mo), silver (Ag), indium (In), tin (Sn), antimony (Sb), tantalum (Ta), tungsten (W), lead (Pb), lanthanum (La), cerium (Ce), praseodymium (Pr) and neodymium (Nd), and the content thereof, expressed as an atomic ratio excluding oxygen (O), is within a range of 0.01 at % to 30 at % both inclusive.

19. The lithium-ion secondary battery according to claim 18, wherein
the content of silicon, expressed as an atomic ratio excluding oxygen (O), in the core section is within a range of 20 at % to 80 at % both inclusive.

20. The lithium-ion secondary battery according to claim 16, wherein in the core section, a half-width (2θ) of a diffraction peak corresponding to (111) crystal plane of silicon obtained by X-ray diffraction is 0.6° or over, and a crystallite size corresponding to the (111) crystal plane is 90 nm or less.

21. The lithium-ion secondary battery according to claim 1, wherein
a bonding state, expressed as a valence number, of silicon atoms to oxygen atoms in the amorphous silicon-based material included in the coating section is a mixed state of zero-valence ($Si^{0+}$), monovalence ($Si^{1+}$), divalence ($Si^{2+}$), trivalence ($Si^{3+}$) and tetravalence ($Si^{4+}$).

22. The lithium-ion secondary battery according to claim 21, wherein
an abundance ratio, expressed as an atomic ratio, of the bonding state of silicon atoms satisfies a relationship of $Si^{0+} \leq Si^{1+} + Si^{2+} + Si^{3+} + Si^{4+}$.

23. The lithium-ion secondary battery according to claim 22, wherein
the abundance ratio of the bonding state of silicon atom satisfies relationships of $Si^{1+} \leq Si^{3+}$, $Si^{2+} - Si^{3+}$, $Si^{1+} \leq Si^{4+}$ and $Si^{2+} \leq Si^{4+}$.

24. The lithium-ion secondary battery according to claim 22, wherein
the abundance ratio of $Si^{4+}$ is 20 at % or over.

25. The lithium-ion secondary battery according to claim 24, wherein
the abundance ratio of $Si^{4+}$ is 30 at % or over.

26. The lithium-ion secondary battery according to claim 1, wherein
each anode active material particle includes an additional coating film applied to a part or all of the surface of the coating section and having a lower electrical resistance than the core section and the coating section.

27. A lithium-ion secondary battery anode comprising:
an anode active material layer including a plurality of anode active material particles,
wherein,
each anode active material particle includes a core section and a coating section applied to a part or all of a surface of the core section, and
the core section includes a silicon-based material $SiO_x$, where $0 \leq x < 0.5$, and the coating section includes an amorphous or low-crystalline silicon-based material $SiO_y$, where $0.5 \leq y \leq 0.9$.

28. A power tool activated by a lithium-ion secondary battery as a power supply, the lithium-ion secondary battery including a cathode, an anode, and an electrolytic solution, the anode comprising:
an anode active material layer including a plurality of anode active material particles,
wherein,
each anode active material particle includes a core section and a coating section applied to a part or all of a surface of the core section, and
the core section includes a silicon-based material $SiO_x$, where $0 \leq x < 0.5$, and the coating section includes an amorphous or low-crystalline silicon-based material $SiO_y$, where $0.5 \leq y \leq 0.9$.

29. An electric vehicle activated by a lithium-ion secondary battery as a power supply, the lithium-ion secondary battery including a cathode, an anode, and an electrolytic solution, the anode comprising:
an anode active material layer including a plurality of anode active material particles,
wherein,
each anode active material particle includes a core section and a coating section applied to a part or all of a surface of the core section, and
the core section includes a silicon-based material $SiO_x$, where $0 \leq x < 0.5$, and the coating section includes an amorphous or low-crystalline silicon-based material $SiO_y$, where $0.5 \leq y \leq 0.9$.

30. An energy storage system using a lithium-ion secondary battery as a power storage source, the lithium-ion secondary battery including a cathode, an anode, and an electrolytic solution, the anode comprising:
an anode active material layer including a plurality of anode active material particles,
wherein,
each anode active material particle includes a core section and a coating section applied to a part or all of a surface of the core section, and
the core section includes a silicon-based material $SiO_x$, where $0 \leq x < 0.5$, and the coating section includes an amorphous or low-crystalline silicon-based material $SiO_y$, where $0.5 \leq y \leq 0.9$.

* * * * *